US011131045B2

(12) United States Patent
deGuzman et al.

(10) Patent No.: US 11,131,045 B2
(45) Date of Patent: Sep. 28, 2021

(54) SYSTEMS, METHODS, AND SOFTWARE FOR MANUFACTURING A KNITTED ARTICLE

(71) Applicant: Appalatch Outdoor Apparel Company, Ventura, CA (US)

(72) Inventors: Mariano deGuzman, Ventura, CA (US); Grace P. Gouin, Jamestown, RI (US); Allyson Ansusinha, Asheville, NC (US)

(73) Assignee: Nimbly, Inc., Ventura, CA (US)

( * ) Notice: Subject to any disclaimer, the term of this patent is extended or adjusted under 35 U.S.C. 154(b) by 0 days.

(21) Appl. No.: 16/513,484

(22) Filed: Jul. 16, 2019

(65) Prior Publication Data

US 2020/0008502 A1 Jan. 9, 2020

Related U.S. Application Data

(63) Continuation-in-part of application No. 15/511,188, filed as application No. PCT/US2015/050214 on Sep. 15, 2015, now Pat. No. 10,351,982.

(Continued)

(51) Int. Cl.
*D04B 37/02* (2006.01)
*G05B 19/4097* (2006.01)
*A41H 3/00* (2006.01)

(52) U.S. Cl.
CPC .............. *D04B 37/02* (2013.01); *A41H 3/007* (2013.01); *G05B 19/4097* (2013.01); *G05B 2219/45194* (2013.01)

(58) Field of Classification Search
CPC ........ G05B 19/40932; G05B 19/40931; G05B 2219/45194; D04B 37/02; A41H 3/007

(Continued)

(56) References Cited

U.S. PATENT DOCUMENTS 4,608,642 A 8/1986 Shima
4,856,104 A 8/1989 Stoll et al.
(Continued)

FOREIGN PATENT DOCUMENTS

WO 03009211 A1 1/2003
WO 2008033138 A1 3/2008
WO 2013058978 A1 4/2013

OTHER PUBLICATIONS

Examination Report issued in corresponding Bangladesh Application No. BD/P/2015/239, dated Feb. 16, 2017, 1 page.

(Continued)

*Primary Examiner* — Danny Worrell
(74) *Attorney, Agent, or Firm* — Fitch, Even, Tabin & Flannery LLP

(57) ABSTRACT

Apparel patterns may be generated as a function of custom apparel information provided by a user, such as one or more measurements, colors, etc., such that the user can have apparel custom-knitted to their particular size and shape without having to acquiesce the high expense and long wait times typically associated with custom-fit clothing. After a custom apparel pattern is generated, a custom-knitted article can be manufactured based on the pattern by transmitting appropriate information to a knitting machine. Data produced while generating custom apparel patterns can be stored and used to optimize and improve the manufacturing of customized knitwear for subsequent users. Further, such data can be shared with third parties such that manufacturers or others can utilize one or more beneficial aspects of the present disclosure without having to implement all of the functionality that would otherwise be required to obtain such benefits.

22 Claims, 13 Drawing Sheets

Related U.S. Application Data

(60) Provisional application No. 62/050,524, filed on Sep. 15, 2014.

(58) Field of Classification Search
USPC .................................... 700/132, 133, 141
See application file for complete search history.

(56) References Cited

U.S. PATENT DOCUMENTS

| | | | |
|---|---|---|---|
| 5,388,050 A | 2/1995 | Inoue et al. | |
| 5,557,527 A | 9/1996 | Kotaki et al. | |
| 5,719,777 A | 2/1998 | Kotaki | |
| 6,353,770 B1 | 3/2002 | Ramsey et al. | |
| 6,415,199 B1 | 7/2002 | Liebermann | |
| 6,516,240 B2 | 2/2003 | Ramsey et al. | |
| 6,546,309 B1 | 4/2003 | Gazzuolo | |
| 6,564,118 B1 | 5/2003 | Swab | |
| 6,611,730 B1 | 8/2003 | Stoll et al. | |
| 6,701,207 B1 | 3/2004 | Gazzuolo | |
| 6,711,455 B1 | 3/2004 | Holloway et al. | |
| 6,860,789 B2 | 3/2005 | Bell et al. | |
| 6,895,787 B2 | 5/2005 | Maeiwa | |
| 6,907,310 B2 | 6/2005 | Gardner et al. | |
| 6,968,075 B1 | 11/2005 | Chang | |
| 7,020,538 B2 | 3/2006 | Luhnow | |
| 7,079,134 B2 | 7/2006 | Kung | |
| 7,346,421 B2 | 3/2008 | Bijvoet | |
| 7,584,122 B2 | 9/2009 | Kozinn | |
| 7,664,564 B2 | 2/2010 | Kawasaki | |
| 8,073,560 B1 | 12/2011 | Clardy et al. | |
| 8,090,465 B2 | 1/2012 | Zeng | |
| 8,506,303 B1 | 8/2013 | Smith | |
| 8,529,263 B1 | 9/2013 | Smith | |
| 9,681,694 B2 | 6/2017 | Ng | |
| 9,695,529 B2 | 7/2017 | Ng | |
| 9,779,699 B2 | 10/2017 | Sugita | |
| 2001/0026272 A1 | 10/2001 | Avihay | |
| 2002/0103566 A1 | 8/2002 | Gadson | |
| 2002/0103714 A1 | 8/2002 | Eze | |
| 2002/0138170 A1 | 9/2002 | Onyshkevych | |
| 2003/0011590 A1 | 1/2003 | Kung | |
| 2003/0074099 A1 | 4/2003 | Yan | |
| 2004/0049309 A1 | 3/2004 | Gardner | |
| 2004/0078285 A1 | 4/2004 | Bijvoet | |
| 2004/0153195 A1 | 8/2004 | Watanabe | |
| 2004/0158345 A1 | 8/2004 | Watanabe | |
| 2004/0186611 A1 | 9/2004 | Wang | |
| 2004/0236455 A1 | 11/2004 | Woltman | |
| 2004/0236456 A1 | 11/2004 | Pieper | |
| 2004/0236457 A1 | 11/2004 | Stabelfeldt | |
| 2005/0131571 A1 | 6/2005 | Costin | |
| 2005/0154487 A1 | 7/2005 | Wang | |
| 2005/0283267 A1 | 12/2005 | Bingham | |
| 2006/0015208 A1 | 1/2006 | Reyes Moreno | |
| 2009/0222127 A1 | 9/2009 | Lind | |
| 2013/0132273 A1 | 5/2013 | Stiege et al. | |
| 2013/0315475 A1 | 11/2013 | Song et al. | |
| 2018/0130112 A1 | 5/2018 | Gerson | |
| 2018/0253508 A1 | 9/2018 | Gupta et al. | |

OTHER PUBLICATIONS

International Search Report and Written Opinion for corresponding International Application No. PCT/US2015/050214, dated Jan. 26, 2016, 11 pages.

International Search Report and Written Opinion, dated Sep. 29, 2020, in corresponding International Application No. PCT/US2020/042365, 14 pages.

| Point of Measure | Inches | For pattern | Converted to stitches |
|---|---|---|---|
| High Point Shoulder Length | 25.19 | | 523 |
| Chest 1" Below Armhole | 20.25 | 10.125 | 149 |
| Back 1" Below Armhole | 20.25 | 10.125 | 149 |
| Front Across Shoulder | 16.75 | 8.375 | 124 |
| Back Across Shoulder | 16.75 | 8.375 | 124 |
| Front Bottom Opening | 19.75 | 9.875 | 146 |
| Back Bottom Opening | 19.75 | 9.875 | 146 |
| Armhole Depth | 9.313 | | 193 |
| Neck Drop (F) | 4.438 | | 92 |
| Neck Drop (B) | 1.438 | | 30 |
| Neck Width | 7.438 | 3.719 | 55 |
| Sleeve Length | 24.25 | | 503 |
| Cap Height | 7.375 | | 153 |
| 1/2 Bicep Width | 7.333 | | 108 |
| 1/2 Forearm Width | 5.833 | | 86 |
| 1/2 Wrist Width | 4.375 | | 65 |
| Back Shoulder Drop | 3 | | 62 |
| Shoulder Drop Step Ratio | | 1 | |
| Side Seam Length | 15.877 | | 329 |
| LPS Length | 23.69 | | 492 |
| Armpit Bindoff | 1 | | 15 |
| Neck Bindoff | 0.25 | | 5 |
| Back Neck Safety Rows | 6 | 3 | 44 |
| Front Neck Safety Rows | 2.5 | 1.25 | 18 |
| Half forearm (H) | 8.4375 | | 175 |
| Top Sleeve Safety Rows | 2.625 | 1.3125 | 19 |
| Armhole Height Step | | 4 | |

FIG. 8

SYSTEMS, METHODS, AND SOFTWARE FOR MANUFACTURING A KNITTED ARTICLE

CROSS-REFERENCE TO RELATED APPLICATIONS

This application claims priority as a continuation-in-part (CIP) of U.S. patent application Ser. No. 15/511,188, filed Mar. 14, 2017, and titled "SYSTEMS, METHODS, AND SOFTWARE FOR MANUFACTURING A CUSTOM-KNITTED ARTICLE," which is a national stage application claiming priority to P.C.T. App. No. PCT/US2015/050214, filed Sep. 15, 2015, which claims priority to U.S. Provisional App. No. 62/050,524, filed Sep. 15, 2014, all of which are herein incorporated by reference.

FIELD OF THE INVENTION

The present invention generally relates to the field of clothing manufacture with computer-controlled machinery. In particular, the present invention is directed to systems, methods, and software for manufacturing a custom, one-off, or on-demand knitted article using automated knitting machines.

BACKGROUND

Various techniques have been developed to address the fact that generic sizes (e.g., small, medium, large) do not provide a sufficient level of granularity to allow for customers of varying shapes and sizes to find affordable clothing that fits well. To avoid generic sizing, customers can obtain custom-fit clothing by employing the services of a tailor, who typically takes a customer's measurements and manually fabricates clothing for the customer, often using generically-sized clothing patterns as a starting point. However, tailors often charge relatively high prices for such services and can only produce a limited quantity of clothes in a given period, which can result in customers purchasing items that have a less-than-ideal fit in order to save money or time.

Creating custom-fit knit clothing has further complexities, which limit its commercial use. With knit clothing, characteristics of the yarn, the wales and courses per inch, the knit pattern chosen, and other aspects of knitting a garment, all influence its construction. For these reasons, among others, the volume production of knit garments customized to a person's size, yarn preferences, knit pattern and other attributes faces barriers of sufficient magnitude that such volume production has not occurred in the garment industry. Further, the characteristics mentioned above require a knitting machine configured to manufacture a knitted article with those specific characteristics. Knitting multiple different style knitted articles with the same machine may therefore require manually reconfiguring the machine between articles.

SUMMARY OF THE DISCLOSURE

In one implementation, the present disclosure is directed to a method of generating a custom apparel pattern. The method performed by a custom-knitting system, which could include a system configured to produce custom, one-off, and on-demand knitted articles, includes receiving first custom apparel information from a user; generating first knitting information as a function of the first custom apparel information; generating a first custom apparel pattern as a function of the first custom apparel information and the first knitting information; and storing the first custom apparel pattern in a custom apparel pattern database.

In another implementation, the present disclosure is directed to a method of automatedly generating a custom apparel pattern for a piece of knitwear. The method performed by a custom-knitting system includes receiving first custom apparel information from a user via a graphical user interface communicatively coupled with a custom apparel apparatus; automatedly generating, at the custom apparel apparatus, first knitting information as a function of the first custom apparel information; automatedly generating, at the custom apparel apparatus, a first custom apparel pattern as a function of the first custom apparel information and the first knitting information; and automatedly storing the first custom apparel pattern in a custom apparel pattern database associated with the custom-knitting system.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 8 is an exemplary points of measure table according to an embodiment of the present disclosure;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems, methods, and software for manufacturing a custom-knitted article through the use of automated knitting machines which create an article of precise shape. In various embodiments, an initial and/or custom apparel pattern may be generated as a function of custom apparel information provided by a user, such as one or more measurements, colors, etc., such that the user can have an article of apparel custom-knitted to their particular size and shape without having to acquiesce the high expense and long wait times typically associated with custom-fit clothing provided by a tailor. After a custom apparel pattern is generated, a custom-knitted article can be manufactured based on the pattern by transmitting appropriate information to a knitting machine. Data produced in the process of generating custom apparel patterns can be stored and used to optimize and improve the process of generating custom apparel patterns for subsequent users. Further, such data can be shared with third parties such that manufacturers or others can utilize one or more beneficial aspects of the present disclosure without having to implement all of the functionality that would otherwise be required to obtain such benefits. The present disclosure provides a number of solutions, many of which are necessarily rooted in computer technology, to overcome various problems extant in the art, many of which arise specifically in the realm of computer-aided manufacturing (CAM) software.

Figure 1:
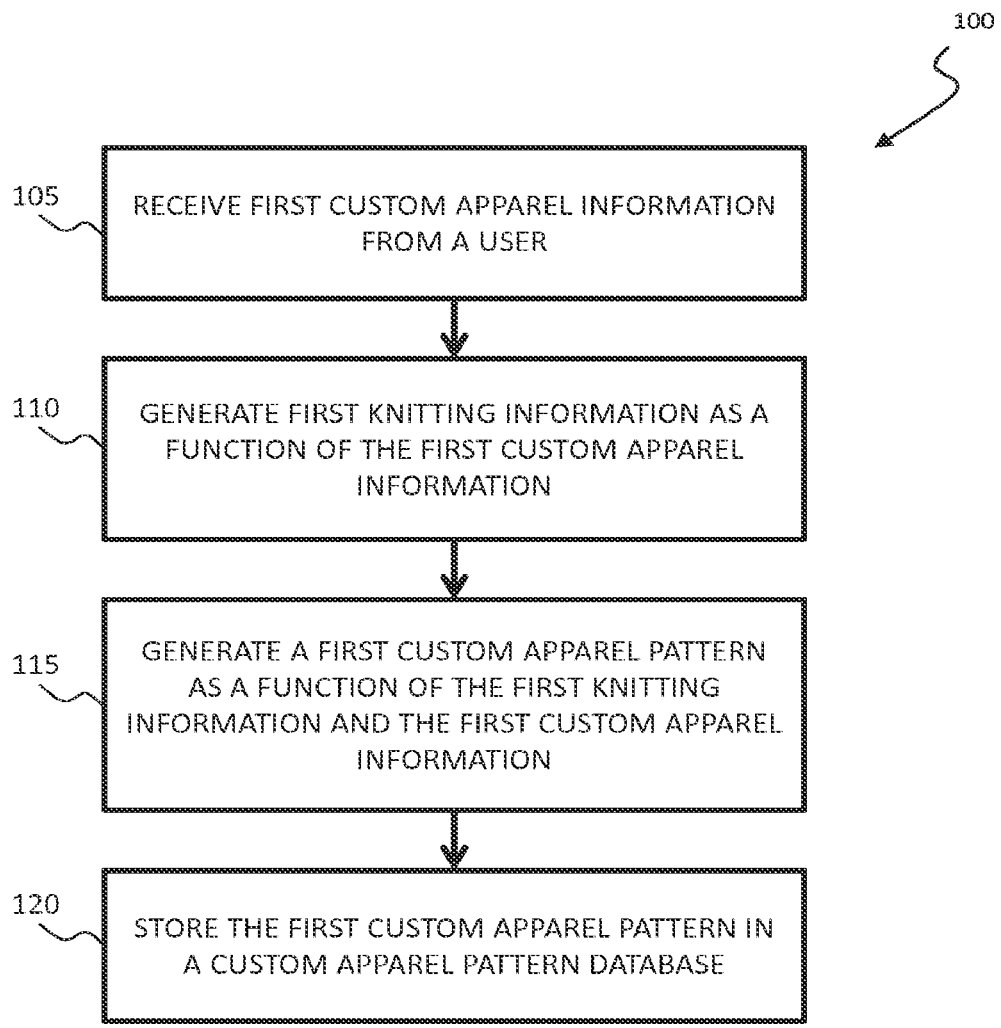
FIG. 1 is a flow diagram illustrating a method of generating a custom apparel pattern.
Figure 2:
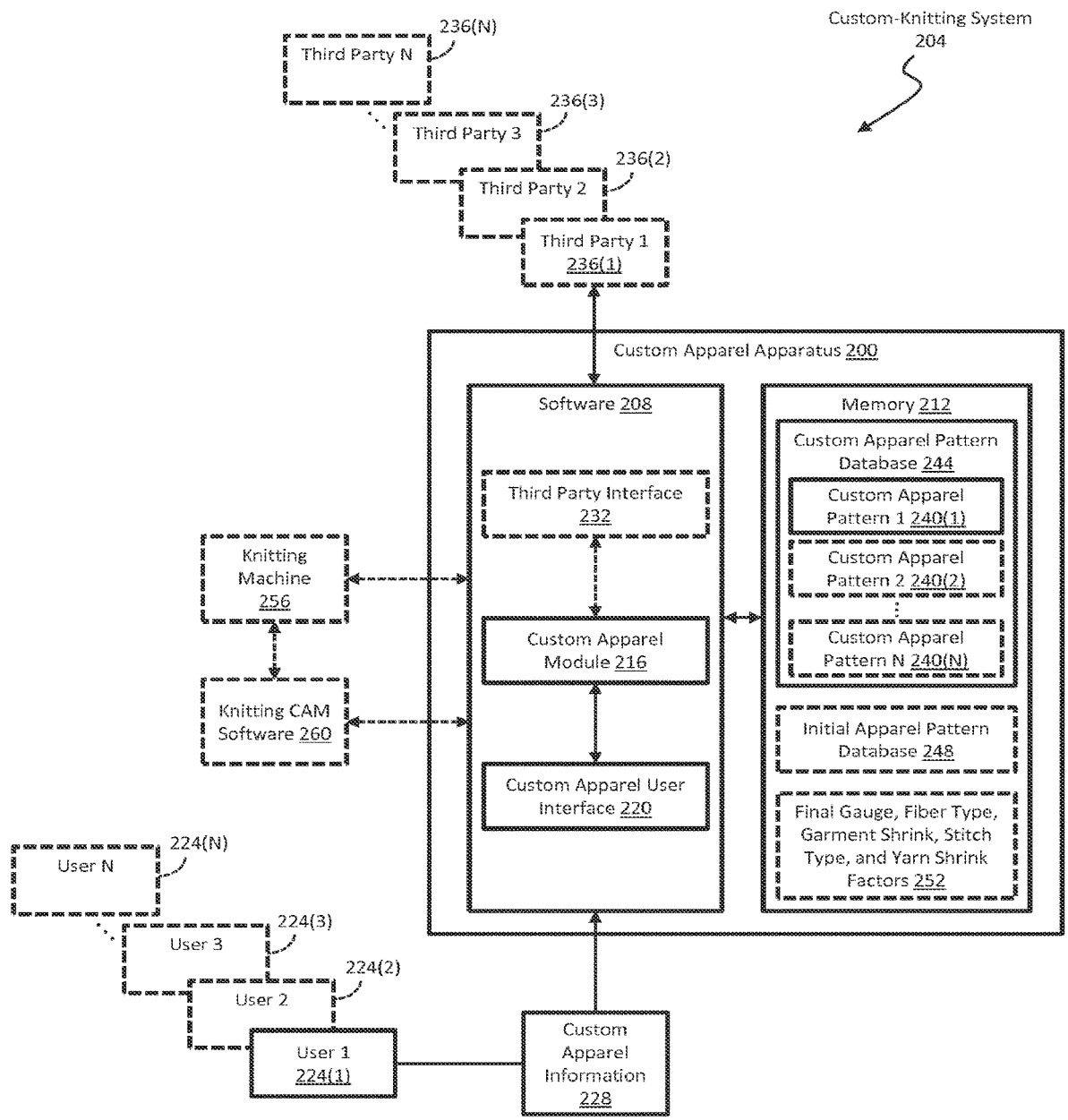
FIG. 2 is a high-level block diagram illustrating an exemplary custom-knitting system that may be used to implement the method of FIG. 1.
Figure 7:
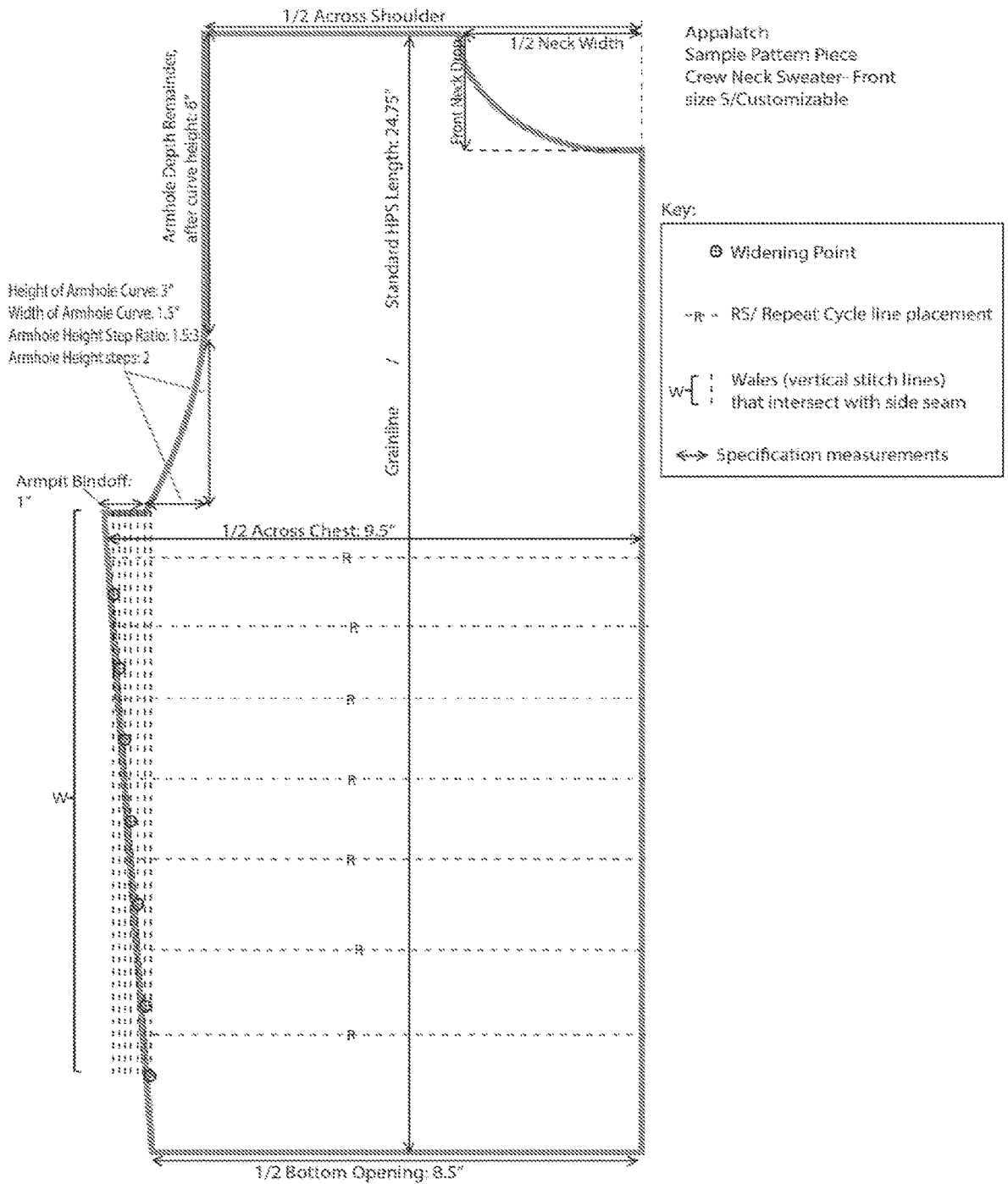
FIG. 7 is a schematic diagram illustrating exemplary breakdown lines of shaping placement, pattern measurement specifications, and repeated or omitted cycle placement in accordance with an embodiment of the present disclosure.

Referring now to the drawings, FIG. 1 illustrates an exemplary method 100 of generating a custom apparel pattern. Method 100 may be implemented in an apparatus, such as in exemplary custom apparel apparatus 200 within custom-knitting system 204 of FIG. 2, using a computing system, such as computing system 700 of FIG. 7 or a network of such or similar computing systems (e.g., a wide-area network, a global network (such as the Internet), and/or a local area network, among others), that is generally: 1) programmed with instructions for performing steps of a method of the present disclosure; 2) capable of receiving and/or storing data necessary to execute such steps; and 3) capable of providing any user interface that may be needed for a user to interact with the custom apparel apparatus, including setting the system up for a custom apparel generating session and viewing any comparative information produced, among other things. Those skilled in the art will readily appreciate that aspects of the present disclosure can be implemented with and/or within any one or more of numerous devices, ranging from self-contained devices, such as a smartphone, tablet, computer, laptop computer, desktop computer, server, or web-server, to a network of two or more of any of these devices. Fundamentally, there is no limitation on the physical construct of the custom-knitting system, as long as it can provide one or more of the features and functionality described herein. In some embodiments, depending on specific implementation, one or more steps of method 100 and/or any other method(s) incorporating features/functionality disclosed herein may be implemented substantially in real-time. FIGS. 2 and 7, described more fully below, illustrate an exemplary custom-kitting system 204 and computer system 700, respectively, that can be used to implement various steps of method 100 and/or any other method incorporating features/functionality disclosed herein.

Prior to describing exemplary method 100, parts of custom-knitting system 204 will first be described to provide context for method 100. Referring to FIG. 2, system 204 may include a custom apparel apparatus 200 for generating custom apparel patterns, which may comprise software 208 and memory 212. Memory 212 may represent any part or the entirety of the memory used by custom apparel apparatus 200 in providing its functionality. Depending upon the particular implementation at issue, memory 212 may be volatile memory, such as primary storage memory (e.g., random-access memory (RAM) or cache memory, etc.), non-volatile memory, such as secondary storage memory (e.g., a magnetic drive, optical drive, etc.), and any combination thereof and in any number of memory devices. Those skilled in the art will readily understand the types of memory(ies) needed for memory 212 for any particular instantiation of a custom apparel apparatus of the present invention.

Software 208 may be considered to include a custom apparel module 216 for processing data and performing calculations and a custom apparel user interface 220 that users 224(1) to 224(N), such as "User 1" 224(1), "User 2" 224(2), "User 3" 224(3), and up to any number of users (designated by "User N" 224(N)), may manipulate or access, for example via email or other appropriate means, such as an appropriate graphical user interface, which may be communicatively coupled with custom apparel apparatus 200 and provided directly via software 208 or indirectly through a separate and/or third party website, among others, in order to provide the software with custom apparel information 228. For example, users 224(1) to 224(N) may access custom apparel interface 220 via another system or apparatus (e.g., a home computer connected to the Internet) or directly via one or more user input devices (e.g., keyboard, mouse, etc.) associated with custom apparel apparatus 200. Custom apparel information 228 provided by users may include sizing information, such as one or more measurements, color information, and/or other constraints or requirements a user provides to specify the custom apparel they require.

It is noted that while the term "module" is used herein, this term is not intended to require any particular configuration of the corresponding software code. For example, "module" should not be construed to mean that the software code is embodied in a discrete set of code independent of the software code for software 208. Rather, the term "module" is used herein merely as a convenient way to refer to the underlying functionality.

Software 208 may further include a third party interface 232 that third parties 236(1) to 236(N), such as "Third Party 1" 236(1), "Third Party 2" 236(2), "Third Party 3" 236(3), and up to any number of third parties (designated by "Third Party N" 236(N)), may manipulate or access in order to provide information to or request information from custom apparel apparatus 200. Third parties 236(1) to 236(N) may comprise clothing designers, manufacturers, or other entities. For example, third parties 236(1) to 236(N) may in some cases desire to utilize custom apparel apparatus 200 to generate custom apparel in much the same way a typical user, such as "User 1" 224(1), might use the apparatus; however, in other cases, the third parties may merely draw information, such as portions of one or more databases, from the custom apparel apparatus for use in generating custom apparel or other products using one or more third party systems. For example, third parties 236(1) to 236(N) may access custom apparel interface 220 via another system or apparatus (e.g., a workstation connected to the Internet) or directly via one or more user input devices (e.g., keyboard, mouse, etc.) associated with custom apparel apparatus 200.

After a user, such as "User 1" 224(1), provides custom apparel information 228 to software 208 of custom apparel apparatus 200 via custom apparel user interface 220, custom apparel module 216 may generate one or more custom apparel patterns, such as custom apparel patterns 240(1) to 240(N), and store the custom apparel patterns in custom apparel pattern database 244 in memory 212. As an intermediate step between receiving custom apparel information 228 from a user and generating one or more custom apparel patterns 240(1) to 240(N), custom apparel module 216 may generate initial apparel patterns as a function of the custom apparel information and store the initial apparel patterns in initial apparel pattern database 248. In some embodiments, custom and initial apparel patterns may include the custom apparel information based upon which they were generated such that the two can be correlated (e.g., using machine learning and/or regression analysis algorithms) to generate higher-quality custom apparel. As used herein, generally, patterns specify all (or at least a preponderance of) required manufacturing details of articles while other information, such as custom apparel information, may only partially specify such manufacturing details. Memory 212 may also contain information regarding final gauge, fiber type, garment shrink, stitch type, and yarn shrink factors 252, which custom apparel module 216 may utilize in generating custom apparel patterns. Such final gauge, fiber type, garment shrink, stitch type, and yarn shrink factors 252 may comprise industry-standard information and/or information derived from the performance of custom apparel apparatus 200.

Software 208 of custom apparel apparatus 200 may interface with one or more knitting machines, such as knitting machine 256, and/or knitting CAM software, such as knitting CAM software 260, as appropriate, in order to produce a custom-knitted article. Notably, automated knitting machines that create the exact shape of the article (e.g., apparel or garment) or the exact article itself may be satisfactorily employed, although other types of knitting machines, such as those typically used in "cut and sew" manufacturing, may also be used. In some cases, knitting machine 256 and/or custom apparel apparatus 200 may comprise knitting CAM software, allowing software 208 to directly interface with the knitting machine. When, however, knitting machines must be controlled using external knitting CAM software, such as knitting CAM software 260, the software of custom apparel apparatus 200 may interface with such CAM software in order to cause the knitting machine to produce a custom-knitted article as a function of a custom apparel pattern, such as "Custom Apparel Pattern 1" 240(1).

For the sake of completeness, it is noted that the unlabeled arrows in FIG. 2 represent temporary and/or permanent data connections that enable data communication between various components of custom-knitting system 204. These connections may be implemented in the form of, for example, data buses, Internet connections, local network connections, and/or any other connections between electronic devices or portions of one or more devices.

With the context of custom-knitting system 204 established and referring again to FIG. 1, and also FIG. 2, method 100 may begin at step 105, at which first custom apparel information is received from a user. As described above, a user, such as "User 1" 224(1) may provide such custom apparel information to software 208 of custom apparel apparatus 200 via custom apparel user interface 220. After receiving such custom apparel information, at step 110, custom apparel apparatus 200 may utilize custom apparel module 216 to generate first knitting information as a function of the first custom apparel information. Such knitting information may comprise particular measurements and/or general specifications for producing a custom-knitted article in accordance with the custom apparel information.

For example, if a user provides a generic overall size, such as small, medium, or large, a neck measurement, and a color as custom apparel information 228, custom apparel module 216 may produce knitting information at step 110 comprising final gauge, fiber type, garment shrink, stitch type, and/or yarn shrink factors determined as a function of the custom apparel information. Additionally or alternatively, custom apparel module 216 may produce knitting information at step 110 as a function of one or more of final gauge, fiber type, garment shrink, stitch type, and/or yarn shrink factors, which may be partially or wholly predetermined. Custom apparel apparatus 200 may store knitting information generated at step 110 in a temporary portion of memory 212, in custom apparel pattern database 244, and/or elsewhere (such as the portion of memory 212 dedicated to final gauge, fiber type, garment shrink, stitch type, and yarn shrink factors 252), as appropriate.

At step 115, custom apparel module 216 may generate a first custom apparel pattern, such as "Custom Apparel Pattern 1" 240(1), as a function of the first knitting information generated at step 110 and the first custom apparel information received at step 105, although it is noted that the first custom apparel information may in some cases only indirectly influence the custom apparel pattern through its effect on the first knitting information. The first custom apparel pattern may comprise particular measurements and/or general specifications for producing a custom-knitted article, optionally as well as one or more of a final gauge, fiber type, garment shrink, stitch type, and/or yarn shrink factor, in accordance with the first custom apparel information received at step 105 and first knitting information generated at step 110. In some embodiments, custom apparel module 216 may generate custom apparel patterns by analyzing knitting information, such as one or more of a final gauge, fiber type, garment shrink, stitch type, and/or yarn shrink factor, in the context of custom apparel information. Such analysis may involve executing a machine learning and/or regression analysis algorithm in order to generate the most appropriate custom apparel pattern possible.

At step 120, custom apparel apparatus 200 may store the first custom apparel pattern generated at step 115 in custom apparel pattern database 244. Such a custom apparel pattern database is useful for storing apparel patterns that custom apparel module 216 can refer to in order to produce a knitted article based on such stored apparel patterns, such as when a user wishes to reorder a piece of apparel or when a user provides custom apparel information that the custom apparel module determines to be compatible with a stored apparel pattern originally produced for another user (in order to optimize processing speed and eliminate unnecessary processing operations). Further, such a custom apparel pattern database can be useful for third parties 236(1) to 236(N), such as "Third Party 1" 236(1), as such third parties can utilize the custom apparel patterns stored therein to produce custom apparel similar to custom apparel that might be produced by custom apparel apparatus 200 itself. This can enable users to order custom articles from third parties that would otherwise not be able to provide such custom articles without utilizing an apparatus like custom apparel apparatus 200.

Accordingly, part or all of custom apparel pattern database 244 may be accessible by one or more third parties 236(1) to 236(N) via third party interface 232, either for a one-time fee or through a subscription. In some embodiments, third parties 236(1) to 236(N) may be able to access custom apparel pattern database 244 to obtain one or more custom apparel patterns, but such custom apparel patterns may be provided in an encrypted format such that a decrypting or interpreting program must be used to translate the encrypted information to instructions for a knitting machine or knitting CAM software. This can allow for sale or lease of unencrypted portions of custom apparel pattern database 244 for a higher price and sale or lease of encrypted portions of the custom apparel pattern database for a relatively lower price, allowing third parties to utilize advantages of custom apparel apparatus 200 to various extents based on their particular objectives and capabilities.

Figure 3:
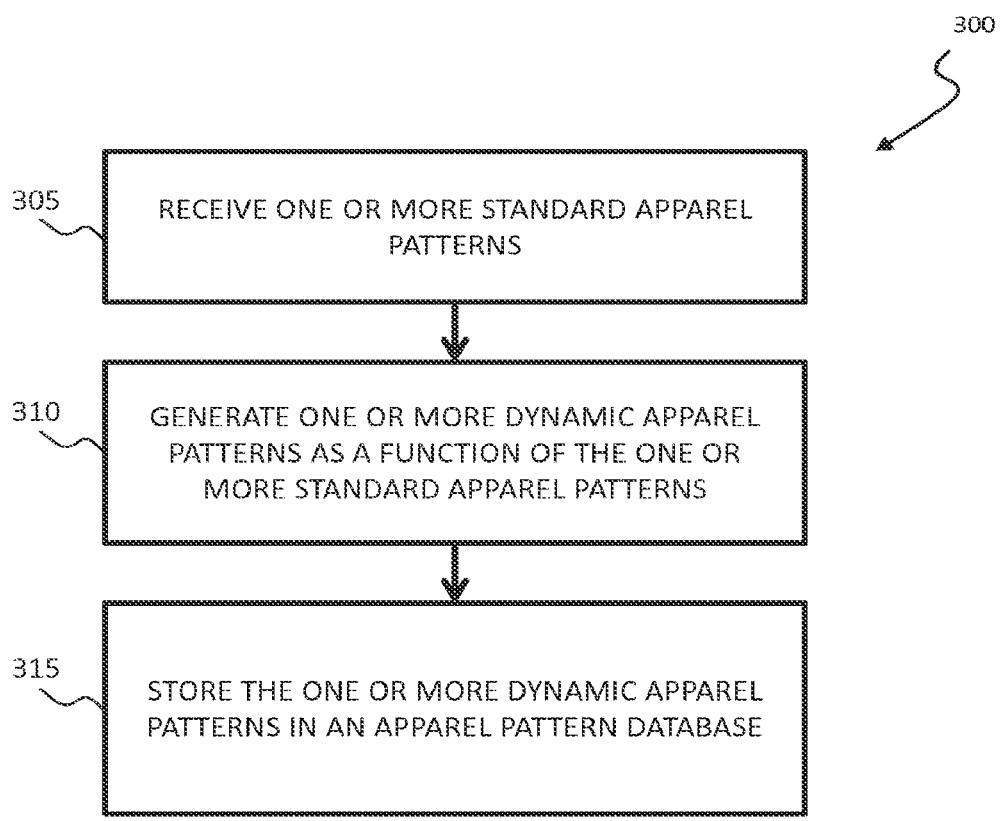
FIG. 3 is a flow diagram illustrating a method of generating dynamic apparel patterns.

Referring now to FIG. 3, after custom apparel module 216 produces a custom apparel pattern (or initial apparel pattern, as described further below), the pattern may be converted to a dynamic apparel pattern through method 300 such that it can be easily modified to conform to custom apparel information that may specify a slightly different article. At step 305, custom apparel module may receive one or more standard apparel patterns, such as a custom apparel pattern or initial apparel pattern, from, e.g., memory 212. At step 310, custom apparel module 216 may generate one or more dynamic apparel patterns as a function of the one or more standard apparel patterns. For example, a particular custom apparel pattern may specify particular neck and torso measurements; at step 310, custom apparel module 216 may specify the extent to which that particular custom apparel pattern may be modified to fit different neck and/or torso measurements. In some embodiments, a range of values may be associated with each measurement or aspect of a standard apparel pattern that can be modified to adhere to different custom apparel information from the custom apparel information that was originally used to generate the standard apparel pattern. This functionality can help to optimize processing speed and eliminate unnecessary processing operations by allowing an apparel pattern that mostly conforms to a set of custom apparel information to be modified to fit that custom apparel information rather than requiring a completely new apparel pattern to be generated. In order to allow such dynamic apparel patterns to be utilized in the future, at step 315, custom apparel module 216 may store the one or more dynamic apparel patterns generated at step 310 in an apparel pattern database, such as custom apparel pattern database 244 or initial apparel pattern database 248.

Figure 4:
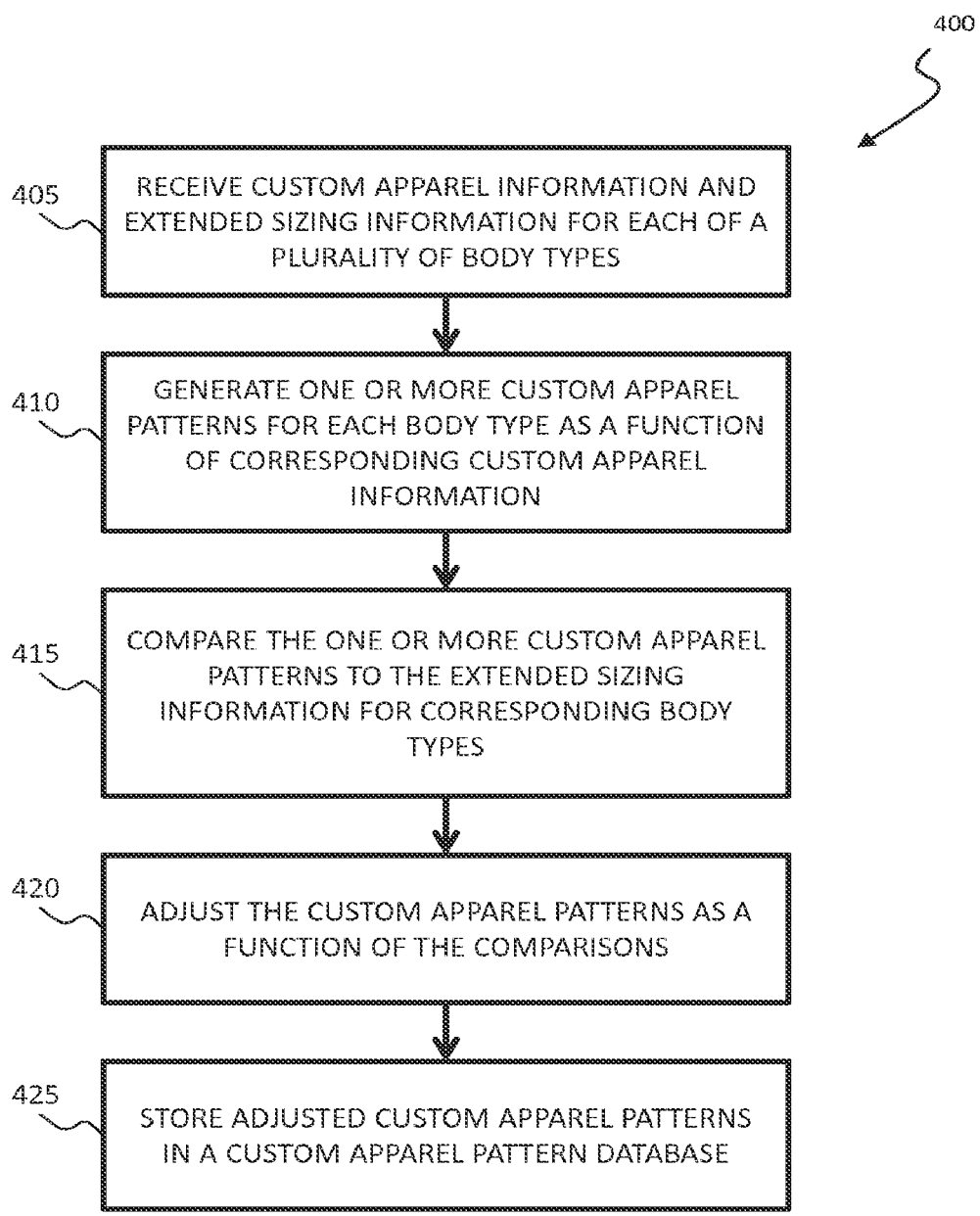
FIG. 4 is a flow diagram illustrating a method of generating custom apparel patterns in accordance with a plurality of body types.

Referring now to FIG. 4, in order to generate apparel patterns, such as custom, initial, and/or dynamic apparel patterns, that fit a large cross-section of a given population (so as to minimize the amount of processing required to produce apparel patterns), a method of generating custom apparel patterns in accordance with a plurality of body types, such as method 400, can be utilized. At step 405, custom apparel module 216 may receive custom apparel information and extended sizing information (e.g., one or more particular measurements) for each of a plurality of body types (such as may be associated with generic overall sizes of small, medium, and large, among others). At step 410, custom apparel module 216 may generate one or more custom apparel patterns for each body type as a function of corresponding custom apparel information, optionally using one or more steps of method 100. At step 415, custom apparel module 216 may compare the one or more custom apparel patterns generated at step 410 to the extended sizing information for corresponding body types received at step 405 and, at step 420, adjust the one or more custom apparel patterns as a function of the comparison(s). This allows for the custom apparel patterns generated as a function of custom apparel information that would typically be received from users of custom apparel apparatus 200 to be compared with extended sizing information that may not be typically received from such users. By adjusting the custom apparel patterns to match such extended sizing information, the custom apparel patterns can be fine-tuned to precisely match various body types. In order to allow such finely-tuned custom apparel patterns to be utilized in the future, at step 425, custom apparel module 216 may store the one or more custom apparel patterns generated at step 420 in a custom apparel pattern database, such as custom apparel pattern database 244. A similar method can be used to generate initial apparel patterns for a plurality of body types. The results of such methods, e.g., custom apparel patterns or initial apparel patterns generated to conform to a plurality of body types using a method like method 400, may be additionally processed using a method like method 300 in order to convert the apparel patterns to dynamic apparel patterns such that they can be quickly and easily modified to fit the widest array of body types possible for a given population.

Figure 5A:
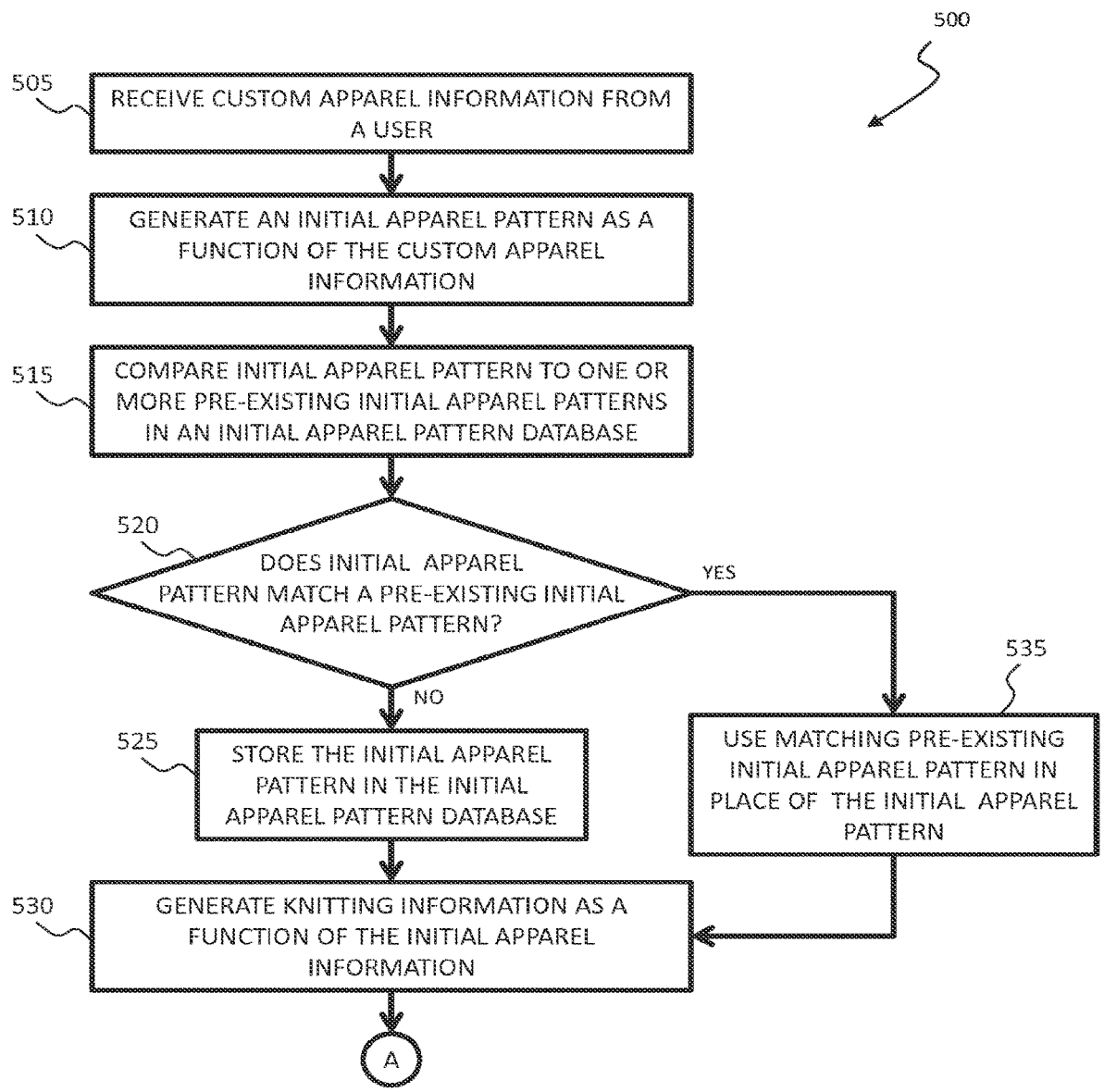
FIGS. 5A and 5B illustrate a flow diagram of a particular implementation of generating a custom apparel pattern.
Figure 5B:
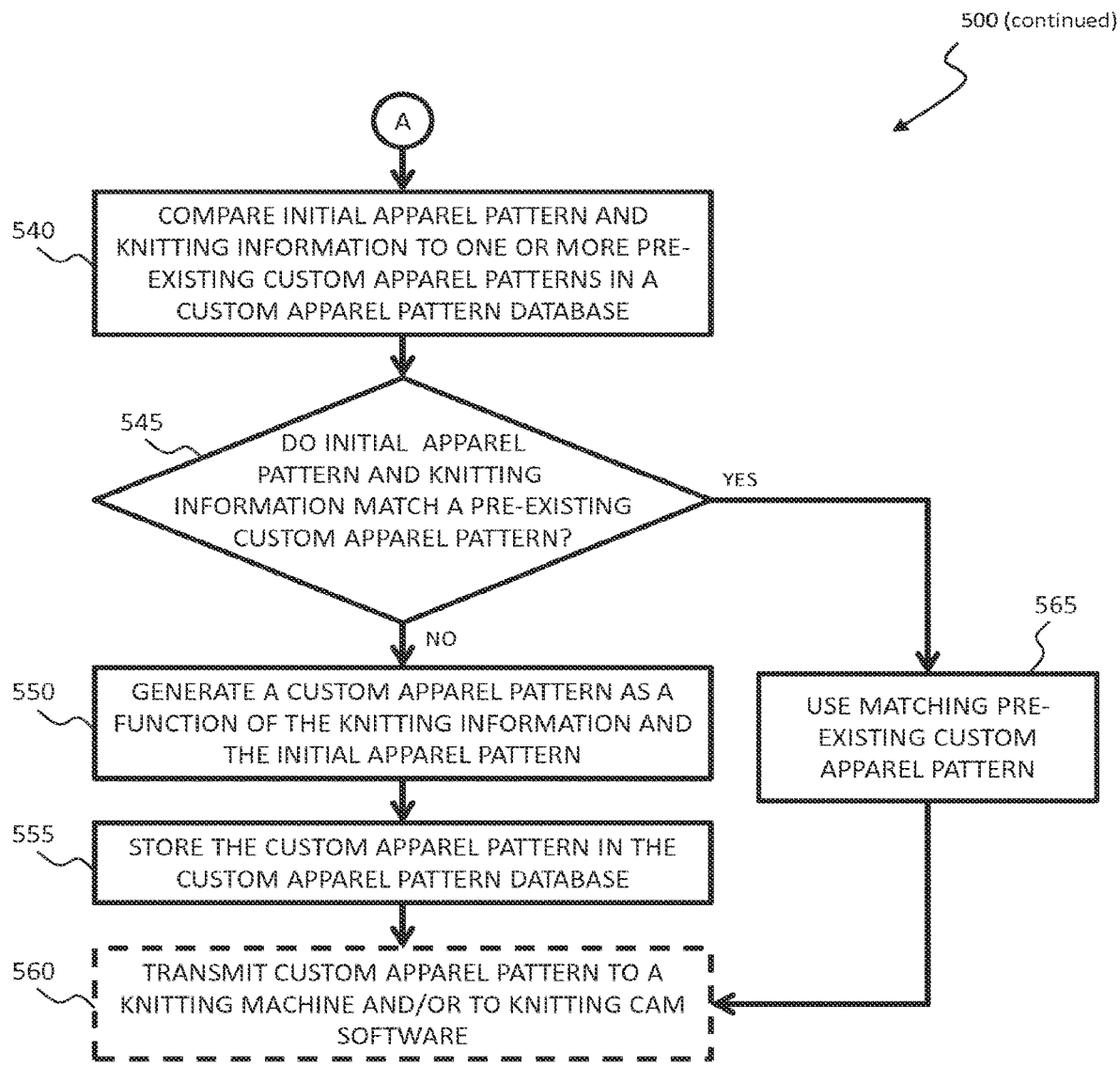

Referring now to FIGS. 5A and 5B, a method 500 illustrating a particular implementation of generating a custom apparel pattern will now be described. At step 505, custom apparel module 216 may receive custom apparel information from a user, similarly to step 105 of method 100. At step 510, custom apparel module 216 may generate an initial apparel pattern as a function of the custom apparel information. Such an initial apparel pattern may comprise a rough interpretation of the custom apparel information and could be used to produce a knitted article, although such an article may have undesirable aesthetic qualities and/or mismatched sizing ratios. In some embodiments, custom apparel module 216 may generate such an initial apparel pattern by referring to one or more other initial apparel patterns in initial apparel pattern database 248 in the process of executing a machine learning and/or regression analysis algorithm in order to generate the most appropriate initial apparel pattern possible. For example, custom apparel module 216 may correlate a set of custom apparel information associated with a particular initial apparel pattern with a set of custom apparel information received from a current user through use of machine learning and/or regression analysis algorithms in order to generate an initial apparel pattern for the current user that should fit and look the best. Additionally or alternatively, custom apparel module 216 may generate initial apparel patterns by analyzing knitting information, such as one or more of a final gauge, fiber type, garment shrink, stitch type, and/or yarn shrink factor, in the context of custom apparel information. Such analysis may involve executing a machine learning and/or regression analysis algorithm in order to generate optimal results.

At step 515, custom apparel module 216 may compare the initial apparel pattern generated at step 510 to one or more pre-existing initial apparel patterns in an apparel pattern database, such as initial apparel pattern database 248. At step 520, if the initial apparel pattern generated at step 510 does not match any of the pre-existing initial apparel patterns in the apparel pattern database, method 500 may proceed to step 525, at which custom apparel module 216 may store the initial apparel pattern in the initial apparel pattern database, after which the method may proceed to step 530. On the other hand, if the initial apparel pattern generated at step 510 does match at least one of the pre-existing initial apparel patterns in the apparel pattern database, method 500 may proceed to step 535, at which point custom apparel module 216 may use a matching pre-existing initial apparel pattern identified at step 515 in place of the initial apparel pattern generated at step 510 and the method may proceed to step 530. In the context of method 500, a pattern is considered to "match" another pattern when at least two or more, but preferably three, four, or more, dimensions or specifications of one pattern are within a predetermined range (such as 10%) of another pattern, though other matching techniques could be used. By utilizing pre-existing patterns when possible and appropriate, the total amount of data storage and the number of calculations required for operation of custom apparel apparatus 200 can be minimized.

At step 530, similarly to step 110 of method 100, custom apparel module 216 may generate knitting information as a function of the initial apparel information received at step 505. In the case that the initial apparel pattern generated at step 510 is found to match a pre-existing initial apparel pattern at step 515, much of the knitting information that would otherwise need to be generated at step 530 may already be known, contained within, and/or associated with the matching pre-existing initial apparel pattern. After knitting information is generated to the extent necessary, method 500 may proceed to step 540 (see FIG. 5B), at which custom apparel module 216 may compare the initial apparel pattern (which may be a pre-existing initial apparel pattern) and the knitting information generated at step 530 to one or more pre-existing custom apparel patterns, such as custom apparel patterns 240(1) to 240(N), in a custom apparel pattern database, such as custom apparel pattern database 244. If the initial apparel pattern and knitting information are not found to match a pre-existing custom apparel pattern at step 540, method 500 may proceed from step 545 to step 550, at which custom apparel module 216 may generate a custom apparel pattern as a function of the knitting information and the initial apparel pattern and, at step 555, may store the custom apparel pattern, such as "Custom Apparel Pattern 1" 240(1), in a custom apparel pattern database like custom apparel pattern database 244. Method 500 may then proceed to step 560. In some embodiments, custom apparel module 216 may generate such a custom apparel pattern by referring to one or more other custom apparel patterns in custom apparel pattern database 244 in the process of executing a machine learning and/or regression analysis algorithm in order to generate the most appropriate custom apparel pattern possible. For example, custom apparel module 216 may correlate a set of custom apparel information associated with a particular custom apparel pattern with a set of custom apparel information received from a current user through use of machine learning and/or regression analysis algorithms in order to generate a custom apparel pattern for the current user that should fit and look the best. Additionally or alternatively, custom apparel module 216 may generate custom apparel patterns by analyzing knitting information, such as one or more of a final gauge, fiber type, garment shrink, stitch type, and/or yarn shrink factor, in the context of an initial apparel pattern and/or custom apparel information. Such analysis may involve executing a machine learning and/or regression analysis algorithm in order to generate optimal results. Returning now to steps 540 and 545, if the apparel pattern and knitting information are not found to match a pre-existing custom apparel pattern at step 540, method 500 may proceed from step 545 to step 565, at which custom apparel module 216 may use the matching pre-existing custom apparel pattern rather than generating a new custom apparel pattern and the method may proceed to step 560. At optional step 560, software 208 may transmit the custom apparel pattern generated at step 550 or selected at step 565, as appropriate, to a knitting machine, such as knitting machine 256, and/or to knitting CAM software, such as knitting CAM software 260, such that a custom-knitted article may be manufactured in conformance with the custom apparel pattern.

Figure 6:
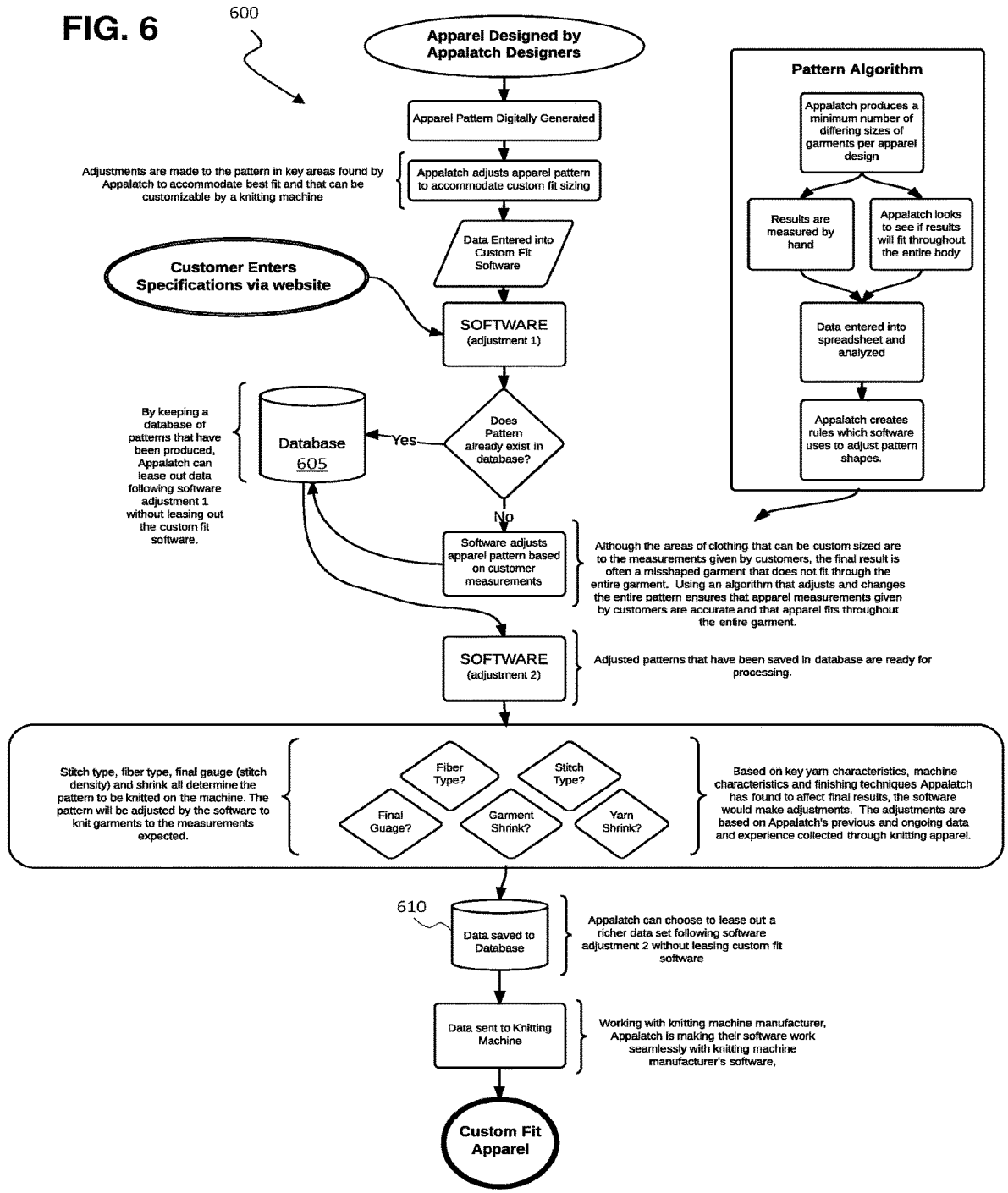
FIG. 6 is a flow diagram illustrating another particular implementation of generating a custom apparel pattern.

In FIG. 6, another particular implementation of generating a custom apparel pattern is illustrated as method 600. As will be readily apparent to those of ordinary skill in the art after reading this disclosure in its entirety, many of the steps of method 600 correspond to steps of methods 100, 300, 400, and 500; however, method 600 incorporates manual activities, such as measuring results by hand, entering data into a spreadsheet, etc., that are not necessarily required to practice various aspects of the invention, though such activities may be particularly helpful in initially configuring custom apparel apparatus 200. Notably, database 605 may correspond to initial apparel database 248 of custom apparel apparatus 200 and database 610 may correspond to custom apparel pattern database 244, although in some embodiments database 605 and 610, and even databases 244 and 248, may be stored in a single, unified database or more than two, optionally distributed, databases, as desired and appropriate.

Particular embodiments of and considerations for creating custom-knit apparel will now be described, which may be implemented in the context of and/or relevant to any one or more aspects of the present disclosure.

Design Development

First, apparel is judiciously designed using materials suitable for mass customization. In order for mass customization to take place, the present inventors have found that the customization process should start with the design stage, various steps of which are outlined below.

A. Source yarn. Work with suppliers to develop yarns that provide required/desired characteristics. For example, in some embodiments, all yarns may need to have a shrinkage that is within +/−1.5%. This is because a first piece may be patterned to a specific shape and then finished (wash/dry/steam). During this finishing process, shrinkage occurs, ultimately affecting the size of a piece of knitwear. As custom fit knitwear often needs to be within ¼ inch of measurements a customer specifies, ensuring that the shrink of yarn is standardized across colors and batches can be important. Having consistent yarns with consistent shrink allows for creating a reusable pattern. Because pattern creation is incredibly time consuming, if consistent shrinkage could not be expected, mass customization could not take place in an efficient manner.

B. Design fabric and determine stitch density. Determine a fabric swatch that represents the desired appearance of the knitwear. Here, a sample may be knitted down and finished (wash/dry/steam), and then shrink may be measured and stitch density may be recorded, which can be used as a basis for knitwear sizing, ensuring that all pattern pieces created account for this shrinkage.

C. Create a range of specifications for standardized pieces of knitwear. Mass customization can be optimized by providing a fast turnaround, i.e., the length of time from when a customer orders a piece to when the piece is shipped. To make that happen, a sizing algorithm may be used, which may be optionally sourced from a third party and which, depending on target demographics, may provide a number of standard size specifications that will most likely fit the vast majority of target customers. This number can be upwards of twenty different sizes, far more than the number of sizes offered by typical retailers. As more information is gathered from customers, this algorithm may adjust these standard sizes to further improve fit of apparel. With an array of standardized sizing known before an order takes place, it is possible to create patterns from base measurement that can be easily adjusted when customization is needed. This allows for a fast turnaround for many custom-fit pieces. For those times where an order from a customer does not fall into the array of standard sizes predicted or already accounted for by the algorithm, a pattern can be created specific to the individual. These patterns can be saved for use in case other customers have the same or similar measurements, as described in earlier portions of the present disclosure.

Generally, the present inventors have found that the primary sizing information that provides the best fit for a knit top is the chest circumference, because it dictates many aspects of proper fit of a knit top. By focusing on chest circumference as a primary indicator of fit, much of the customization of knitwear can be standardized, such as the height of the shoulder cap, depth of armhole, etc. Through analysis of three-dimensional historical anthropometric body measurements, the present inventors have found that, e.g., for knit tops, the chest circumference measured 1" below armhole best mirrors what the fit of the shoulder area should be. The fit of the chest circumference and shoulder area typically determine the shape of the armhole curve, and the shoulder cap and bicep width together should create a complementary curve to fit into the armhole correctly. The armhole curve and the shoulder cap curve are difficult to change without interrupting the designed silhouette. Through an understanding of how chest circumference measurements relates to shoulder cap, arm hole depth area, and other areas that account for proper fit in the shoulder/chest area, the present inventors have found that it is possible to quickly and reliably pattern this area using the three-dimensional historical anthropometric body measurements as the basis of creating a digital pattern breakdown that, in a vast majority of cases, provides the best fit. This enables the manufacturing of customized knitwear to be expedited while still achieving proper fit of apparel. The primary sizing information needed for other styles of knitwear, such as a knit dress or knit pants, may be one or more of the following according to the style of the knitwear: chest circumference, waist circumference, hip circumference, and/or inseam length.

D. Design the silhouette. Silhouette, which may be referred to as the "shape" of a piece of knitwear, is created. Silhouettes may be based on latest fashion, trends, etc., to give a particular fit. For example, a silhouette may be designed for a high-waist sweater, a sweater with a boxy shape, a fitted dress, or slim trousers.

E. Design a two-dimensional ("2D") paper pattern and then create a DPB for custom fit knitwear based off of the 2D paper pattern, preferably taking into consideration a combination of knowledge of concepts that allow for optimal mass customization. The DPB is the division of the 2D paper pattern's perimeter into segments and the assignment of those segments corresponding to equations within the custom fit software. Using knowledge of traditional pattern making, designers may create a 2D paper pattern and apply traditional pattern making rules to the piece, while accounting for the way in which automated knitting machines knit pieces and the fact that each piece needs to be customized. Typical knitting machines are able to add 1 stitch to the piece's perimeter to widen per knit row and combine up to half of the stitches in one row at a time to narrow a piece. These narrowing and widening actions are called shaping. In view of this, a 2D paper pattern is made, taking into consideration how the knitting machine will be shaping a knitted piece. The designer creates breakdowns on the 2D paper pattern piece where repetitions or omissions to the number of rows being knit can be made without affecting the aesthetics or interrupting the overall proportion of the pattern piece that may lead to poor fit. Traditional 2D paper pattern making gives designers geometric rules that adhere to the general symmetry of the human body; taking care not to break these rules by too large of a margin can be incredibly important. The present inventors have created rules and adjusted 2D paper patterns where these repeated or omitted places (RS Cycles) within the piece can exist, ensuring a well-fitting garment where style is not affected by customization. These repetition/omission breakdowns should be made between the knit rows where shaping takes place. The present inventors have discovered various areas within knitwear that are best suited for these repetitions or omissions to occur, which include: (1) the sleeve between the wrist and under the armpit (2) on the bodice between the bottom opening and under the armpit (3) the skirt between the hip and the bottom opening and (4) the pant leg between the bottom opening and the crotch level. The number of breakdowns needed can be determined by the desired angle or curve and the frequency of widening or narrowing necessary to achieve it. In general, considerations that should be kept in mind when patterning for customization include: (1) potential to include repetition areas (RS) for custom length and placement there-of; (2) fabric designs that won't be aesthetically changed by custom fit; (3) the shaping ability of the particular knitting machine to be used (fashioning frequency); and (4) stretch factor and recovery.

As shown in FIG. 7, in some embodiments, widening points can be found at intersections of wales and side seams. In view of this, the patternmaker can use stitch density to determine placement of wales. The RS/repeat cycles should fall between widening points in order to not disturb the knitting machine's shaping or the desired angle of the seam. The armhole height steps, i.e., the number of courses knit by the machine before narrowing a stitch, can be determined by the ratio of the width and height of the armhole curve, which can be determined during the patterning stage based on the style.

Next, the custom fit software with selected DPB is ready to receive the customer's selections. Such custom fit software can be made to automatedly produce the necessary inputs for a digitized knitting pattern (DKP) created by CAM software which the knitting machine uses to properly knit down a piece. A DKP is a shape created by the CAM software that is formed using the segment distances traveled in height and width stitches on the x- and y-axis. The necessary inputs are created by the custom fit software that can be the segment distances traveled on the x- and y-axis to form the desired shape in stitches. For example, using the specifications of the DPB that were developed from the 2D pattern described above and applying the stitch density found, the custom fit software is able to take a customer's selections (e.g., the style, fiber, size, and color) and produce inputs that can be entered into or otherwise provided to CAM knitting software that runs the knitting machine. Once the custom fit software's produced inputs are provided to the CAM knitting software, the software can create a DKP specific to the customization requested by customers. Aspects of design that custom fit software can automatedly produce or determine include: (1) stitch number conversions: all height value stitch number cells typically should be rounded down to an even number; (2) lines for each segment of broken down pattern perimeter, which may include: x-distance traveled in stitches and/or y-distance traveled in stitches; (3) whether fabric is knit using standard or 1×1 technique: if 1×1 technique is to be used, then the custom fit software may double the wales-per-inch value to account for the skipping of needles; (4) stitch density settings, which create the dimensions for the garment a customer demands.

Provide Necessary Information to Custom Fit Software

A. Receive submission of measurements from customer, which may comprise one or more of: (1) bust/chest (one measurement; may be considered the most important measurement); (2) waist (for bespoke only); (3) drop waist (two measurements); (4) across shoulder measurement (for bespoke only); (5) torso length (for bespoke only); (6) arm length (four measurements); (7) bicep circumference (for bespoke only); (8) ideal knitwear length (e.g., high point shoulder length or "HPS") (three measurements); and (9) neck (e.g., loose or standard).

B. Record customer data and determine their standard size, e.g., using bust/chest measurement; customer's closest standard size provides the base target measurements from the standard size pattern (e.g., armhole depth, cap height, bicep circumference, across shoulder).

C. From customer data, determine type of customization needed, e.g., none, custom length, or bespoke (bespoke means custom length and custom width target measurements).

D. Select an appropriate DPB for the requested style. For example, a style may comprise a designer's silhouette and fabric structure, optionally, as well as a customer's selected yarn color(s) and fiber(s). If a customer chooses a style where no customization is needed, then the DPB for a standard size may be selected. If a custom length is required, a standard width DPB can be selected for a given style with RS cycles and the RS cycles can be set to repeat as many times as necessary in order to achieve the desired length. If bespoke, select a DPB for the style and select the closest standardized size according to chest circumference, then in the points of measure ("POM") table, adjust the target specification width of the chest and one or more of the following parameters to tailor the garment to the individual: bottom opening, armhole depth, cap height, bicep circumference, and across shoulder lengths. Then the sizing can be stored in a pattern database to be recalled for future use on customers with similar measurements, as described above.

E. Provide DPB to custom fit software and apply one or more of the following changes: fiber type; yarn color(s); standard size base; customer name; and/or stitch density of 1 sq. in., including wales per inch and/or courses per inch.

F. Results calculated by custom fit software, ones of which are listed below, can then be input into CAM knitting machine software. If no customization is required, use of custom fit software is not required and the DKP can be used to directly knit a piece. For customers who need custom length, inputs listed below with an (L) label can be provided to the custom fit software. For bespoke, inputs listed below with an (L) label and a (B) label can be provided to the custom fit software. Unlabeled inputs (i.e., those without an (L) or (B) label) are automatically generated according to the pattern created during the design development process. Generally, the custom fit software can automatically compute segment distances traveled in height and width stitches on the x- and y-axis using target measurements listed below and stitch density of fabric structure/yarn selection of desired style.

a. HPS length=Ideal knit length−height of rib trim (L)
    b. Across chest=½ chest circumference+ease (B)
    c. Across back=½ chest circumference+ease (B)
    d. Front bottom opening=½ Drop waist circumference+ease (B)
    e. Back bottom opening=½ Drop waist circumference+ease (B)
    f. Across shoulder (B)
    g. Armhole depth=Standard according to base size (i.e., no (B) or (L)) or changes corresponding to cap height changes and customer's bicep (B)
    h. (Front & back) Neck drop=Standard according to base size
    i. Sleeve length=Arm Length−½ Across Shoulder−height of rib trim (L)
    j. Cap height=Standard size (i.e., no (B) or (L)) or changes corresponding to the difference of standard across shoulder vs. bespoke across shoulder (B)
    k. Bicep width=Standard according to base size (i.e., no (B) or (L)) or ½ customer's bicep circumference+ease (B)
    l. ½ Forearm width=Standard according to base size
    m. ½ Wrist width=Standard according to base size
    n. Back shoulder drop=Standard according to base size
    o. Back shoulder width step=Standard according to base size
    p. Side seam length=HPS length−armhole depth
    q. Armpit bind-off=Standard
    r. Neck vertical bind-off=Standard
    s. Back neck safety rows width=Standard
    t. Front neck safety rows width=Standard
    u. Half forearm=½ *(Sleeve length−cap height)
    v. Top sleeve safety rows=Standard according to base size
    w. Armhole height step=Standard according to fashioning frequency Transfer of Data from Custom Fit Software to CAM Knitting Machine Manufacturer Software A. Shape, which may be stored in, e.g., .shp format, although other formats and/or file types may be used depending on the particular knitting machines and systems being used, is created using computer aided manufacturing (CAM) software, which may be provided by manufacturers of automated knitting machines. Such a shape may specify one or more of:

a. Plotting points of pattern input as determined by custom fit software for selected style and/or knit structure;
    b. Shape function of each line (e.g., Narrowing, Widening, Bind-off);
    c. Narrowing/widening placement width of each line;
    d. Fade-out width of each line;
    e. Shape attribute modules of each line; and
    f. Shape Edge(s) NP Values on each line.

B. Shape is placed on fabric "yardage," which may be stored in, e.g., .mdv format, a file type primarily associated with graphic interfaces for processing patterns using particular knitting machines, although other formats and/or file types may be used depending on the particular knitting machines and systems being used.

C. Safety rows are inserted where necessary, e.g., neck opening start.

D. Yarn carrier colors are drawn in above safety row insertion, which may include one or more of:

a. use contrast color to differentiate split yarn carriers after neck opening;
    b. allocate yarn carriers corresponding to location on program;
    c. insert comment of yarn color, number of ends, Nm of yarn; and
    d. set protection row yarn to clamping at fabric end.

E. Set machine slow at armpit bind off course, above and below.

F. Cut out shape.

G. Start technical processing.

H. Extract program to USB drive or otherwise store program.

Automated Knitting Machine Knits Down Piece

Once the program is input into the knitting machine, the machine is ready to knit the product.

Further Discussion of Customization of Knitwear

As described above, custom fit software can use customer submitted data in combination with original designs to create garments that are fit specifically to each individual customer. The customer-submitted data may include selections of style, fiber, and/or color. These selections may be provided in accordance with a designer's apparel collection, which may be presented to the customer via a website, kiosk, or other interface. Custom fit software is used for knit apparel, design elements of which include: silhouette, pattern, fabric structure, yarn selection, and CAM Software, as described above. The silhouette can be understood as the finished drape of the garment on a body. The pattern is composed of individual flat shapes that are joined together to form a finished, three-dimensional garment. The pattern may exist in various forms including (1) 2D flat paper pattern, (2) digital pattern breakdown (DPB) in custom fit software, and (3) digitized knitting pattern (DKP). The fabric structure may comprise selected stitch combinations and/or designed graphic elements. The yarn selection may comprise one or more of the fiber, the yarn gauge, and the order in which the yarn is interlaced into the fabric structure. Together, the fabric structure and yarn selection form a unique stitch density. The stitch density is the number of wales per inch by the number of courses per inch, i.e., the number of stitches across 1" horizontally and down 1" vertically, respectively. CAM programs, as described herein, are files that communicate with and/or control automated knitting machines.

One point of novelty of custom fit software is its ability to quickly compute the necessary numbers/values and/or other inputs to program a file for use with the CAM software. By breaking down the designer's pattern and using the stitch density, the custom fit software translates a customer's selections (e.g., the style, fiber and/or color of knit apparel) into a code that can be provided to CAM software to create a program that communicates with the automated machine.

In some embodiments, after the silhouette and pattern are determined, the pattern's perimeter can be broken down into segments. Wherever the perimeter line changes angle, a new segment can begin. Each segment is assigned a code line in the custom fit measurement software's shape coordinates tables (see, e.g., Table II) composed of two equations in separate cells. Cell 1 corresponds to the x-axis, and cell 2 corresponds to the y-axis. The sum of each cell, in and of itself, equals the traveling distance on its respective axis. These equations are formed using the technical specifications (e.g., target measurements) from the pattern, the stitch density, and the position of the end-point of the preceding segment. The target measurements are input into the custom fit software's POM table (see, e.g., FIG. 8), then the POM table's inherent equations multiply each target measurement by its corresponding stitch density (wales for width measurements and courses for length measurements). The equation (target measurement*stitch density) determines the number of stitches (or stitch number) required to achieve the correct measurement. The stitch number is then used to travel along the pattern's segments and plot the points (corners) of the pattern.

The technical specifications may be changed according to a customer's data entry. For example, the target sleeve length may be lengthened or shortened depending on a customer's arm length, or the target bottom opening may be widened or narrowed according to a customer's drop waist measurement.

Further Discussion of Custom Fit Software

The custom fit software was developed to quickly and automatically create the inputs needed for the CAM software to create a DKP the knitting machine uses to properly knit down a piece to specifications. While it was developed specifically for the customization process, the inventors use it to quickly and automatically create the inputs the CAM software needs when creating standardized knitwear. This custom fit software is composed of four main input sections, which include: knitwear details, stitch density, points of measure, and shape coordinate tables, each of which is further described below. The number of lines in a shape coordinate table can be determined by the number of segments in the DPB.

The knitwear details are the key to the style that is being created and give the production team the information they need to knit a piece of knitwear on the machine. These details may include one or more of: the yarn information (e.g., Biella Wool 2×NM30/2), the color(s) (e.g., charcoal), the size of the garment (e.g., small/custom), and/or the name or other identifier of the customer. These details do not directly affect any of the calculations used in creating the piece of knitwear, and so are not strictly necessary in the customization process, but can give the production team information that can be associated with the garment through its production for record-keeping purposes.

The stitch density table requires user input of the number of wales per inch and courses per inch of the knit structure being used for the customized garment. These may be counted from the fabric swatch and may specify the stitches in one inch widthwise and heightwise.

TABLE I

EXEMPLARY STITCH DENSITY TABLE

| Stitch Density: | | | Set to inches: | 4" |
|---|---|---|---|---|
| Width: | 14.75 | Wales per inch | 59 | Wales per 4" |
| Height: | 20.75 | Courses per inch | 83 | Courses per 4" |

The user of the custom fit software may input the wales and courses per inch or they can be provided automatedly, and then the custom fit software can convert that number into a 4" (or other) stitch density, according to the CAM software required stitch density setting. The user of the custom fit software may also or alternatively choose to count using the metric system or such counts could be provided automatedly, and the custom fit software may then determine the stitch density by counting the number of stitches in a 10 mm square section and set the stitch density to millimeters instead of inches.

The POM table (see, e.g., FIG. 8) uses the garment specifications and converts these measurements into stitches. Custom Fit Software can be set up to half the measurements if they are a widthwise measurement to account for the fact that some CAM software mirrors shapes across the x-axis, with the x-axis being the shape's center line if the shape is symmetrical. If the shape is asymmetrical, the Custom Fit Software can be set up to follow the segments determined by the DPB.

First, the specifications can be input as inches. Then, the custom fit software may multiply each specification by either the wales per inch or courses per inch in the stitch density table, according to whether the specification measures across the width or height respectively. The custom fit software may account for which stitch density is used in the "converted to stitches" column according to the orientation of the specification. The user of the custom fit software may also choose to work in the metric system and input their specifications in millimeters if their stitch density is also set to millimeters. Those of ordinary skill in the art will understand that appropriate conversions can be provided to allow for hybrid imperial/US/metric measurements or conversions, among others, as desired or necessary.

For example, the "high point shoulder length" in inches (see FIG. 8) can be multiplied by the "courses per inch," such as that which may be included in a stitch density table, and the outcome can be stored as a "converted to stitches" value (see FIG. 8). Using the values in this example, that equation may be: (25.19*20.75)=522.69. The sum, 522.69, may be rounded to the nearest whole number (523) in cases where the knitting machine to be used can only accept whole numbers of stitches and/or knit whole stitches.

Converting the "chest 1" below armhole" value into stitches may require two equations, because it may be a width measurement. First, the value can be divided in half, as shown in the "for pattern" column of FIG. 8. Second, the value in the "for pattern" column can be multiplied by "wales per inch," such as may be included in a stitch density table, the product of which is represented in the "converted to stitches" column of FIG. 8. Again using the values in this example, those equations are: (20.25/2)=10.125; and (10.125*14.75)=149.34, rounded to 149. In this example, the user of the custom fit software would input their desired specifications into the cells highlighted in dark gray in FIG. 8. However, in some embodiments, the values in the cells highlighted in dark gray may not need to change. The embodiments in which the values may not need to change are when the specifications have been entered according to a standard size, and according to the customer's measurements the standard specification values do not need to be changed. The cells not highlighted in dark gray may be determined automatedly as a function of the entered or automatedly provided values. For example, side seam length=high point shoulder length−armhole depth or 25.19−9.313=15.877; half forearm (height)=(sleeve length−cap height)/2, or (24.25−7.375)/2=8.4375; and armhole depth converted to stitches=inches*courses per inch or 9.313*20.75=193.

Shape coordinate tables may be composed of cells in a spreadsheet or other appropriate means that computes the x-distance to travel and y-distance to travel in the CAM software. The number of rows in such a spreadsheet may be determined by the perimeter breakdown of the garment pattern piece. For example, a basic front pattern piece may be broken down into six segments for the body (see Table II, below) and the neck opening element may be broken down into four segments (see Table III, below). These rows may comprise height and width cell, which may use sums from a "converted to stitches" calculation, which may be stored in a POM table like that of FIG. 8.

TABLE II

EXEMPLARY BODY SHAPE COORDINATE
TABLE, FRONT PATTERN PIECE

| Segment | Height (R) | Width (N) |
|---------|------------|-----------|
| 1 | 0 | −146 |
| 2 | 329 | −4 |
| 3 | 0 | 15 |

TABLE II-continued

EXEMPLARY BODY SHAPE COORDINATE
TABLE, FRONT PATTERN PIECE

| Segment | Height (R) | Width (N) |
|---------|------------|-----------|
| 4 | 44 | 11 |
| 5 | 149 | 0 |
| End | 0 | 124 |
| Total | 523 | 0 |
| Request | 523 | |

TABLE III

EXEMPLARY NECK SHAPE COORDINATE
TABLE, FRONT PATTERN PIECE

| Segment | Height (R) | Width (N) |
|---------|------------|-----------|
| 1 | 0 | −18 |
| 2 | 87 | −36 |
| 3 | 5 | 0 |
| End | 0 | 55 |
| Total | 92 | 0 |
| Request | 92 | |

Figure 9:
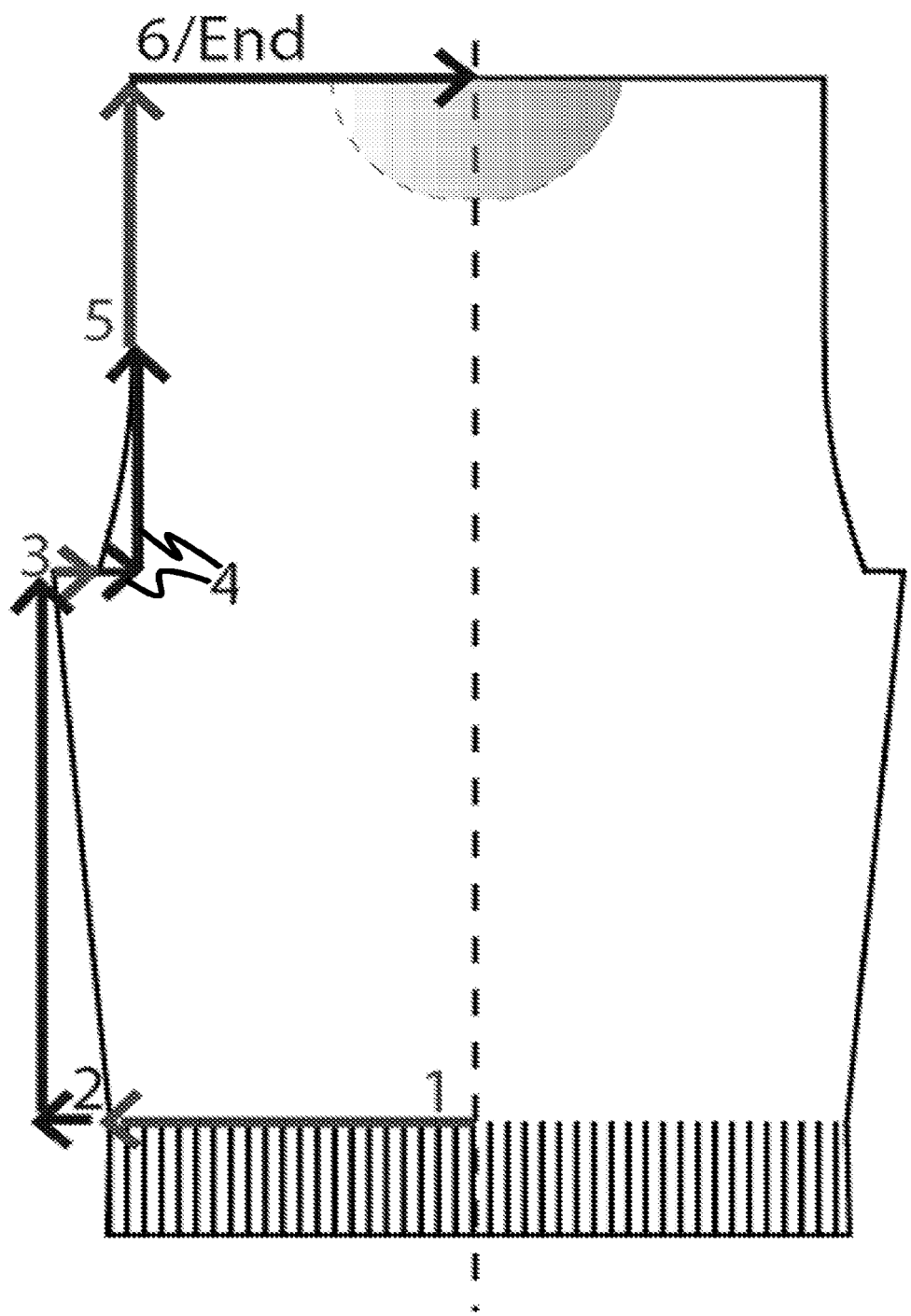
FIG. 9 is a schematic diagram illustrating an exemplary front pattern piece breakdown in accordance with an embodiment of the present disclosure.

The simple front pattern piece breakdown shown in FIG. 9 illustrates the height and width values found in shape coordinates tables like those of Tables II and III. In this example, the sweater front body piece (Table II, FIG. 9) has been broken down into six segments according to the designer's desired shape and how the knitting machine to be used knits a piece. The arrows in FIG. 9 represent the breakdown of each perimeter segment into a horizontal and/or vertical increase or decrease. The size and/or shape of these segments may be determined by specifications like those that may be entered into the "inches" column of a POM table like that shown in FIG. 8. In FIG. 9, segment 1 corresponds to the ½ bottom opening above the rib knit start, segment 2 corresponds to the width increase from bottom opening to chest 1" below armhole and the side seam length, segment 3 corresponds to the armpit bindoff width decrease, segments 4 correspond to the remaining width to narrow (decrease) after the armpit bindoff to reach the specified ½ across shoulder measurement and the height steps taken according to designer specified armhole height steps, segment 5 corresponds to the height remainder of the armhole depth after segments 4 height steps are reached, and segment 6 corresponds to the ½ across shoulder measurement which is the remaining distance to (0,0) (see, e.g., FIGS. 8 and 9). These 6 segments correspond to the six segment rows in the Table II.

Figure 10:
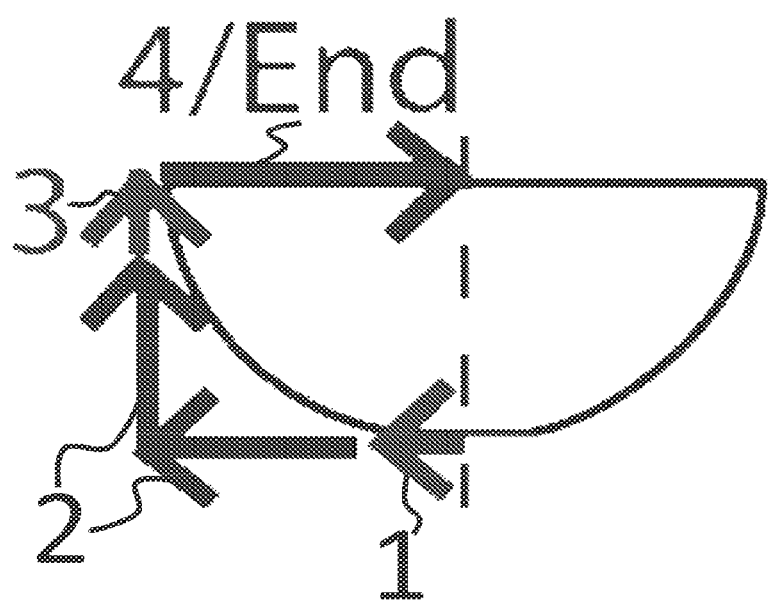
FIG. 10 is a schematic diagram illustrating an exemplary neck opening piece breakdown in accordance with an embodiment of the present disclosure.

A simple neck opening piece, a shape element that can be placed on top of the front body piece (like that of FIG. 9) in the CAM knitting software, an example of which is shown in FIG. 10, can be broken down into four segments. The segments may be assigned according to the desired neck opening shape and the shaping capabilities of the knitting machine to be used. As shown in the example of FIG. 10, segment 1 corresponds to the ½ front neck safety rows width, segment 2 corresponds to the remaining ½ neck width after safety rows and front neck drop height minus neck bindoff height, segment 3 corresponds to the neck bindoff height, and segment 4 corresponds to the ½ neck width, which is the remaining width distance to return to (0,0).

Each consecutive segment in FIGS. 9 and 10 may correspond to one row of a shape coordinate numbers table, like those of Tables II and III. In some embodiments, the custom fit software may round sums into whole numbers to represent stitches and may show the outcome in each cell in the "converted to stitches" column in the POM table of FIG. 8 and the height and width columns of Tables II and III. However, one or more of the equations used to generate the values of these cells may use non-rounded numbers to give the most exact outcome. As such, although one or more equations described below may not appear to produce mathematically accurate results, because decimals are being used inside of the custom fit software, the final sum is the most accurate stitch number to be used in the creation of the CAM shape. In general, equations may use the values of the cells in the "converted to stitches" column of FIG. 8, which are each a sum resulting from another equation that may be used in the POM table of FIG. 8.

Segment 1 in FIG. 9 corresponds to the first segment row of Table II. This row provides the number of stitches required for the specification of the bottom opening of the sweater piece. The shape coordinate table uses the front bottom opening converted to stitch numbers from FIG. 8, but that value is inverted (made negative) because the CAM software to be used in this example uses the lines to the left of the x-axis, or (-x,y) points. The equations for the first segment row in Table II are: height=0; and width=−(front bottom opening) or −149.

Segment 2 in FIG. 9 corresponds to the second segment row of Table II. The equations for the second segment row in Table II are: height=side seam length stitches or 329; and width=chest 1″ below armhole−bottom opening or 149−146=−4 (see FIG. 8). Segment 3 in FIG. 9 illustrates the "armpit bindoff" value converted to stitches, which is 15 (see FIG. 8). Segments 4 in FIG. 9 correspond to the third segment row of Table II. The equations for the fourth segment row in Table II are: height=armhole height step*sum of width cell (described further below); and width=chest 1" below armhole−armpit bindoff−front across shoulder or 149−15−124=11 (see FIG. 8). Segment 5 in FIG. 9 corresponds to the remainder of the armhole depth after segments 4. The equations for the fifth segment row in Table II are: height=armhole depth−height cell of the fourth segment row in Table II or 193−44=149; and width=0. Segment 6 in FIG. 9 illustrates the across shoulder measurement of the pattern and the end line of the pattern. The equations for the sixth segment row in Table II are: height=0; and width=front across shoulder.

The process of breaking down a flat pattern shape into segments may be applied to any shape. The number of segments a pattern's perimeter is broken down into varies according to the shape. The number of lines in the Shape Coordinates table may be increased or decreased according to the segments in a pattern.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
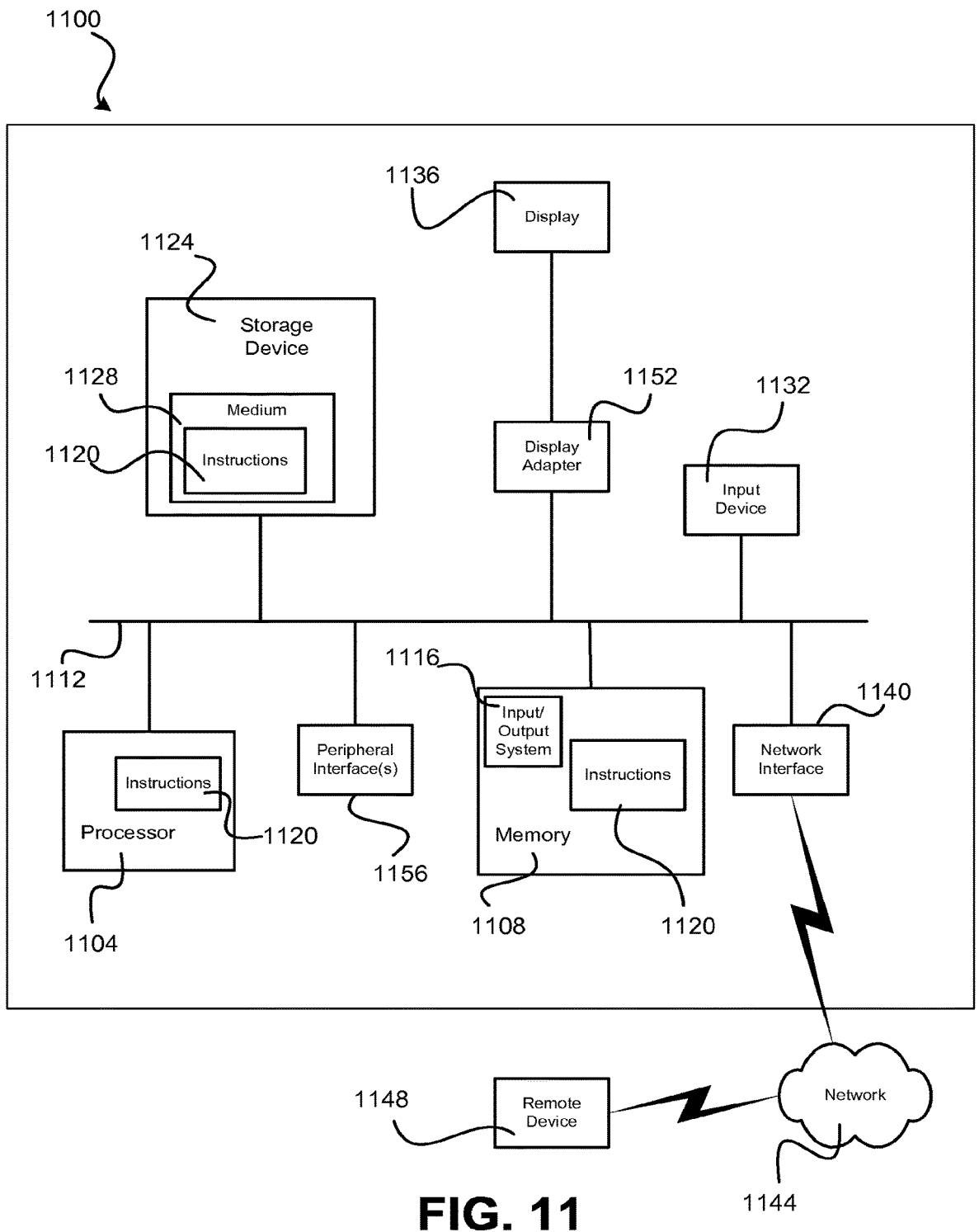
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system, such as the custom-knitting system 204 of FIG. 2, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Memory 1108 may include various components (e.g., machine-readable media) including, but not limited to, a random access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

As discussed above, the apparel apparatus interfaces with multiple knitting machines, such as knitting machine 256, either directly or through knitting computer-aided manufacturing ("CAM") software which communicates with and/or control automated knitting machines in order to produce a knitted article. Exemplary automated knitting machines include flat bed knitting machines or circular knitting machines. This includes automated knitting machines configured to create exact shapes of articles or finished knitted articles themselves as well as other types of knitting machines, such as those used in "cut and sew" manufacturing, which are configured to create portions of a knitted article which are then cut out and sewn together to finalize the article. As further discussed above, the apparatus stores and utilizes information about the particular knitting machines being used, such as the shaping ability of the particular knitting machines. In some embodiments, an apparel apparatus in communication with a plurality of knitting machines assigns apparel articles to be produced to a particular one of the plurality of machines based at least in part on the stored information. Such embodiments are illustrated in FIG. 12.

Figure 12:
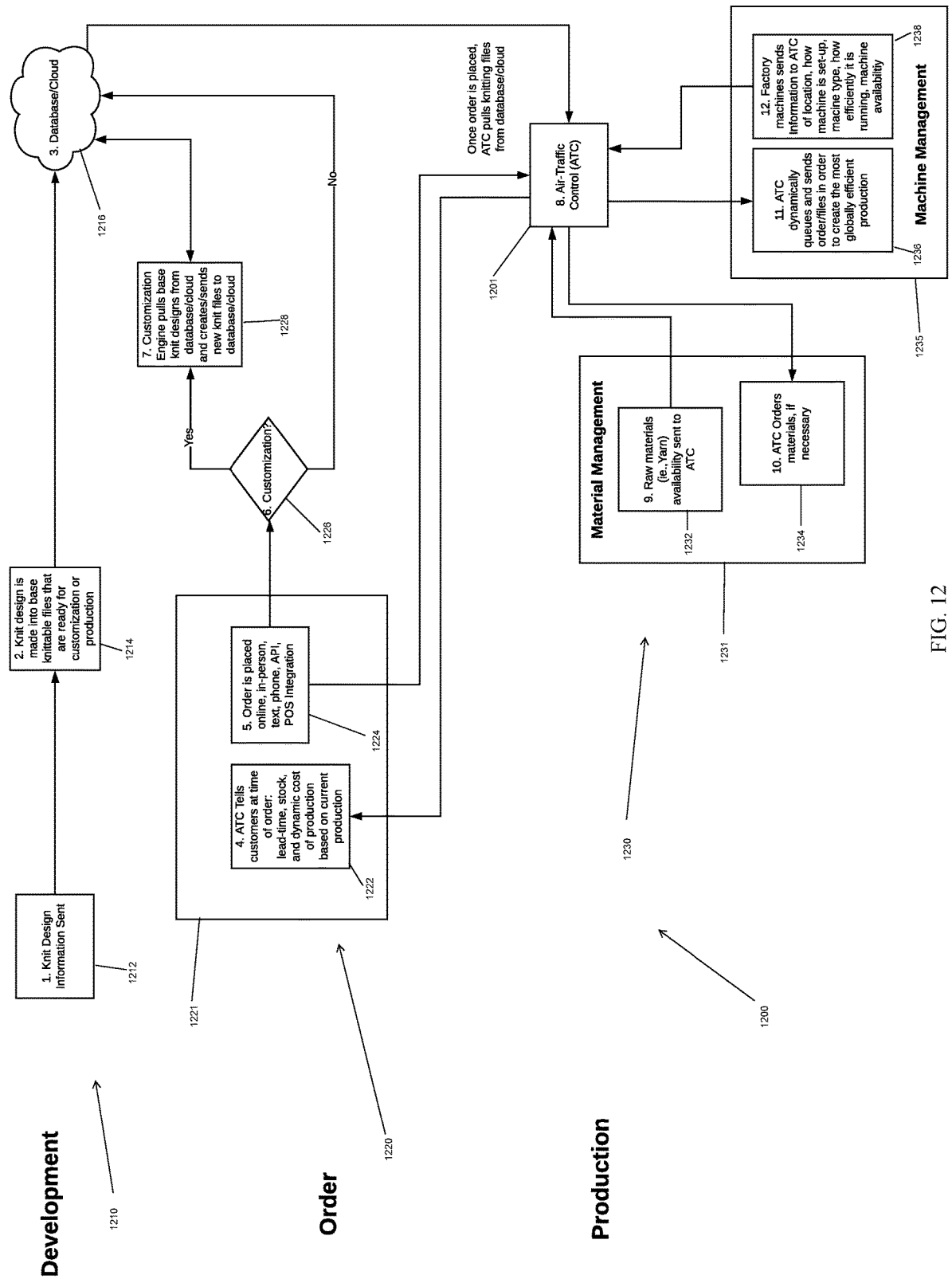
FIG. 12 is a diagrammatic view of a computing system for facilitating the manufacturing of a custom, one-off, or custom knitted article.

FIG. 12 illustrates a knitted article manufacturing system 1200 having an apparel apparatus 1201. The apparel apparatus 1201 is a computing system, such as the computer system 1100 described above, having memory and a processor. The computing system is a single computer or a network of multiple computers. The knitted article manufacturing system 1200 is configured to perform the methods described above. The knitted article manufacturing system 1200 manages all stages of manufacturing knitted articles including the development 1210 of knitted articles, the ordering 1220 of knitted articles, and the production 1230 of knitted articles.

As shown in FIG. 12, in the development stage 1210 the following steps are performed. Initially, knit design information is sent at 1212 to the system 1200. In some forms, the knit design information is sent at 1212 to the apparel apparatus 1201. Alternatively, the system 1200 includes a separate computing system, such as the custom apparel apparatus 200, which receives the knit design information. The knit design information is converted 1214 into a knittable file or pattern. The knittable file or pattern is then stored in an apparel pattern database 1216, such as a cloud storage database. The apparel pattern database 1216 includes both an initial pattern database and a custom apparel database, such as the initial pattern database 248 and custom pattern database 244 described above. The apparel pattern database 1216 is communicatively coupled to the apparel apparatus 1201 over the internet. Alternatively, the apparel pattern database 1216 is stored in the memory.

To control production, the apparel apparatus 1201 is configured to perform material management 1231 and machine management 1235. Raw material availability is sent at 1232 by knitting machines and/or the inventory management systems of knitted article factories to the apparel apparatus 1201. When a factory or machine is low on a particular raw material, the apparel apparatus 1201 orders at 1234 the material. In some forms, the apparel apparatus compares current amounts of specific raw materials to predetermined reorder thresholds. When the amount of a specific raw material is less than the reorder threshold, the apparel apparatus orders more of the material. In alternative embodiments, the apparel apparatus 1201 stores historical material usage data. The apparel apparatus 1201 predicts future material use based on the stored historical data. New material is ordered based on the predicted use.

Machine management 1235 involves knitting machines and/or factories transmitting at 1236 information about the knitting machines to the apparel apparatus 1201. As discussed above, the information includes machine shaping capabilities. Machine shaping capabilities include how the particular machine is set up including what materials are loaded into the machine, the gauge of materials used by the machine, specific rulers or other accessories included with the machine, and the machine type. Additional information sent to the apparel apparatus 1201 includes machine availability (such as a schedule of planned machine usage), the location of the machine, operating cost of the machine, the file types readable by the machine, and the operating efficiency of the machine. Based on the above information, the apparel apparatus 1201 sends at 1238 orders to particular machines.

The system 1200 includes a user interface 1221 for managing orders. The user interface 1221 enables users, such as customers, to view knitted article options, such as styles, colors, yarn types, sizes, etc. to select a knitted article. The apparel apparatus displays at 1222 lead time, stock, and cost of each article based on the material management and machine management information discussed above. In some forms, the cost displayed is a dynamic cost that is continuously updated as machine and material availability change.

The user places an order at 1224. In some forms, the customer directly places the order through the user interface 1221 which can include a website and/or an application. In other forms, the customer places the order to a user, such as a salesperson at an apparel store or a customer service operator, in person, over the phone, by text, or through other communication means. The user then inputs the order into the system 1200 via the user interface 1221.

The system 1200 compares the order to patterns in the apparel pattern database 1216 at 1226 to determine if customization is necessary. If the order matches an existing pattern, the existing pattern is received by the apparel apparatus 1201 from the apparel pattern database 1216. If no existing pattern matches, a new custom apparel pattern is created at 1228 through the methods described above. The new custom apparel pattern is then stored in the apparel pattern database 1216 and also transmitted to the apparel apparatus.

The apparel apparatus 1201 sends the order, including the pattern or machine-readable file, to a particular one of, or a set of, the plurality of knitting machines. The apparel apparatus 1201 first determines which of the plurality of knitting machines is capable of producing the ordered apparel article based on the shaping capabilities of the knitting machines. If a knitting machine is not capable of manufacturing the apparel article as currently setup, but can be reconfigured to manufacture the apparel article, the cost and time required to reconfigure the knitting machine is factored in by the apparel apparatus 1201.

The apparel apparatus 1201 determines which machine or machines to use between the machines capable of manufacturing the apparel article based on the manufacturing cost, lead-time, reconfiguration cost, reconfiguration time, machine location, shipping cost, and/or shipping time. In some forms, these factors are combined to determine a final cost and delivery date. The final cost and delivery date of multiple options is sent to the user such that the user can choose a manufacturing option.

The knitted article manufacturing system 1200 increases the efficiency by which custom, one-off, or on-demand knitted articles are manufactured. The apparel apparatus 1201 automates the process from the initial order being received from the customer or user to the article being manufactured, thus reducing the amount of overhead and middlemen. Further, utilizing a plurality of knitting machines in multiple locations, with different shaping capabilities, and different available materials enables user to choose from a wider variety of knitted articles. Distributing orders among this plurality of machines reduces machine downtime and lead-time to manufacture articles, as well as reducing instances of reconfiguring knitting machines to satisfy one-off or small orders. Reducing the need to reconfigure knitting machines thereby reduces the cost of the custom, one-off, or on-demand knitted articles.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

The present disclosure provides a number of solutions, many of which are necessarily rooted in computer technology, in order to overcome various problems extant in the art, many of which arise specifically in the realm of CAM software. Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of manufacturing a knitted article, the method comprising:
   receiving apparel information from a user at an apparel apparatus, the apparel apparatus being interfaced with a plurality of knitting machines;
   receiving capability information of one or more of the plurality of knitting machines;
   transmitting one or more of an apparel pattern based on the received apparel information, information associated with the apparel pattern, and information derived from the apparel pattern to a predetermined one of the knitting machines to cause the predetermined one knitting machine to make the knitted article.

2. The method of claim 1 wherein the capability information includes information representing shaping capabilities of the one or more knitting machines.

3. The method of claim 1 further comprising selecting the predetermined one knitting machine from the plurality of knitting machines based on the capability information.

4. The method of claim 1 further comprising receiving additional information selected from a group consisting of knitting machine availability information, knitting machine location information, material availability information, cost information, shipping information, and combinations thereof.

5. The method of claim 4 further comprising selecting the predetermined one knitting machine from the plurality of knitting machines based on the additional information.

6. The method of claim 4 further comprising determining a total cost of the knitted article based on the additional information.

7. The method of claim 6 further comprising selecting the predetermined one knitting machine from the plurality of knitting machines based on the total cost of the knitted article.

8. The method of claim 4 further comprising determining a delivery date of the knitted article based on the additional information.

9. The method of claim 6 further comprising selecting the predetermined one knitting machine from the plurality of knitting machines based on the delivery date of the knitted article.

10. The method of claim 1 wherein transmitting one or more of an apparel pattern, information associated with an apparel pattern, and information derived from an apparel pattern to the predetermined one knitting machine comprises transmitting one or more of an apparel pattern, information associated with an apparel pattern, and information derived from an apparel pattern directly to the predetermined one knitting machine.

11. The method of claim 1 wherein transmitting one or more of an apparel pattern, information associated with an apparel pattern, and information derived from an apparel pattern to the predetermined one knitting machine comprises transmitting one or more of an apparel pattern, information associated with an apparel pattern, and information derived from an apparel pattern to a control system configured to control the predetermined one knitting machine.

12. A system for manufacturing knitted articles, the system comprising:
   a user interface;
   a plurality of knitting machines;
   an apparel apparatus,
   wherein the apparel apparatus configured to receive apparel information from the user interface and to receive knitting machine information from the plurality of knitting machines, and
   wherein the apparel apparatus is configured to transmit one or more of an apparel pattern, information associated with an apparel pattern, and information derived from an apparel pattern to one knitting machine of the plurality of knitting machines based on the apparel information and the knitting machine information.

13. The system of claim 12 wherein the knitting machine information is selected from a group consisting of knitting machine capabilities, knitting machine availability information, knitting machine location information, material availability information, cost information, shipping information, and combinations thereof.

14. The system of claim 12 further comprising an apparel pattern database.

15. The system of claim 14 wherein the apparel apparatus is configured to generate the apparel pattern based on the apparel information and a stored apparel pattern of the apparel pattern database.

16. The system of claim 14 wherein the apparel pattern database is configured to store the apparel pattern.

17. A method of manufacturing a knitted article, the method performed by a knitting system and comprising:
   receiving apparel information from a user;
   generating knitting information as a function of the apparel information;
   receiving knitting machine information from a plurality of knitting machines;
   transmitting one or more of an apparel pattern, information associated with an apparel pattern, and information derived from an apparel pattern to one of the plurality of knitting machines to cause the knitting machine to make the knitted article.

18. The method of claim 17 further comprising determining which of the plurality of knitting machines is capable of making the knitted article based on the apparel information and the knitting machine information.

19. The method of claim 17 further comprising:
   determining a cost of the knitted article when manufactured by a first knitting machine of the plurality of knitting machines;
   determining a cost of the knitted article when manufactured by a second knitting machine of the plurality of knitting machines; and
   determining which of the first knitting machine and the second knitting machine has the lower cost of the knitted article,
   wherein transmitting to the one knitting machine of the plurality of knitting machines comprises transmitting to the one of the first knitting machine and the second knitting machine that is determined to have the lower cost.

20. The method of claim 19 wherein the cost of the knitted article when manufactured by the first knitting machine and the cost of the knitted article when manufactured by the second knitting machine comprises a manufacturing cost and a shipping cost.

21. The method of claim 17 further comprising:
   determining a delivery date of the knitted article when manufactured by a first knitting machine of the plurality of knitting machines;
   determining a delivery of the knitted article when manufactured by a second knitting machine of the plurality of knitting machines; and determining which of the first knitting machine and the second knitting machine has the earlier delivery date of the knitted article, wherein transmitting to the one knitting machine of the plurality of knitting machines comprises transmitting to the one of the first knitting machine and the second knitting machine that is determined to have the earlier delivery date.

22. The method of claim 17 wherein the knitting machine information is selected from a group consisting of knitting machine capabilities, knitting machine availability information, knitting machine location information, material availability information, cost information, shipping information, and combinations thereof.

* * * * *